(12) United States Patent
Tabata et al.

(10) Patent No.: US 7,811,190 B2
(45) Date of Patent: Oct. 12, 2010

(54) DRIVE DEVICE FOR VEHICLE AND METHOD OF ASSEMBLING THE SAME

(75) Inventors: Atsushi Tabata, Okazaki (JP); Terufumi Miyazaki, Toyota (JP); Atsushi Kamada, Toyota (JP); Yutaka Taga, Aichi-gun (JP)

(73) Assignee: Toyota Jidsoha Kabushiki Kaisha, Toyota-shi (JP)

( * ) Notice: Subject to any disclaimer, the term of this patent is extended or adjusted under 35 U.S.C. 154(b) by 546 days.

(21) Appl. No.: 11/909,088

(22) PCT Filed: Jun. 26, 2006

(86) PCT No.: PCT/JP2006/313166

§ 371 (c)(1),
(2), (4) Date: Sep. 19, 2007

(87) PCT Pub. No.: WO2006/137601

PCT Pub. Date: Dec. 28, 2006

(65) Prior Publication Data

US 2009/0082151 A1    Mar. 26, 2009

(30) Foreign Application Priority Data

Jun. 24, 2005    (JP) .............................. 2005-184266
Jun. 24, 2005    (JP) .............................. 2005-184686

(51) Int. Cl.
*F16H 3/72*    (2006.01)
(52) U.S. Cl. ....................................................... 475/5
(58) Field of Classification Search .................. 475/5, 475/149, 150, 331
See application file for complete search history.

(56) References Cited

U.S. PATENT DOCUMENTS

| 6,022,287 | A | 2/2000 | Klemen et al. | |
| 6,719,656 | B2 * | 4/2004 | Bowen | 475/5 |
| 6,770,005 | B2 * | 8/2004 | Aikawa et al. | 475/5 |
| 6,777,837 | B2 * | 8/2004 | Tsuzuki et al. | 310/67 R |
| 7,001,296 | B2 * | 2/2006 | Yamauchi et al. | 475/5 |
| 7,001,297 | B2 * | 2/2006 | Shimizu et al. | 475/5 |
| 2005/0115750 | A1 | 6/2005 | Takami et al. | |

FOREIGN PATENT DOCUMENTS

EP    1 317 050 A2    6/2003

(Continued)

*Primary Examiner*—Ha D. Ho
(74) *Attorney, Agent, or Firm*—Oblon, Spivak, McClelland, Maier & Neustadt, L.L.P.

(57) ABSTRACT

A vehicular drive system including a first electric motor, a power distributing mechanism, and a second electric motor disposed on a first axis, and an automatic transmission portion disposed on a second axis parallel to the first axis, and a power transmitting member at an end of the first axis remote from an input rotary member and a rotary member at an end of the second axis remote from the input rotary member are connected to each other through a drive linkage, thereby a total axial dimension of the first electric motor, power distributing mechanism, and second electric motor and an axial dimension of the automatic transmission portion are substantially equal to each other, whereby the axial dimension of the drive system is reduced. A housing of the vehicular drive system includes mutually separate first, second, third, and fourth casing portions, so the drive system can be easily assembled.

14 Claims, 22 Drawing Sheets

FOREIGN PATENT DOCUMENTS

| | | |
|---|---|---|
| JP | 0 528 412 A1 | 2/1993 |
| JP | 7 4477 | 1/1995 |
| JP | 9 193676 | 7/1997 |
| JP | 0 791 495 A2 | 8/1997 |
| JP | 2000 295709 | 10/2000 |
| JP | 2003 301731 | 10/2003 |
| JP | 2004 114945 | 4/2004 |
| JP | 2004 204995 | 7/2004 |
| JP | 2004 353780 | 12/2004 |

* cited by examiner

| | C0 | C1 | C2 | B0 | B1 | B2 | B3 | SPEED RATIO | STEPPING RATIO |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | SPREAD 4.76 |
| R | | | ○ | | | | ○ | 3.209 | |
| N | ○ | | | | | | | | |

○ ENGAGED
◎ ENGAGED FOR STEP-VARIABLE SHIFTING, AND RELEASED FOR CONTINUOUSLY-VARIABLE SHIFTING

FIG. 22

| | C0 | C1 | C2 | C3 | B0 | B1 | B2 | SPEED RATIO | STEPPING RATIO |
|---|---|---|---|---|---|---|---|---|---|
| 1st | ◎ | ○ | | | | | ○ | 3.174 | 2.00 |
| 2nd | ◎ | ○ | | | | ○ | | 1.585 | 1.59 |
| 3rd | ◎ | ○ | | ○ | | | | 1.000 | 1.37 |
| 4th | ◎ | | | ○ | | ○ | | 0.731 | 1.30 |
| 5th | | | | ○ | ◎ | ○ | | 0.562 | SPREAD 5.64 |
| R | | | ○ | | | | ○ | 2.717 | |
| N | | | | | | | ○ | | |

○ ENGAGED
◎ ENGAGED FOR STEP-VARIABLE SHIFTING, AND RELEASED FOR CONTINUOUSLY-VARIABLE SHIFTING

FIG. 24

| | C0 | C1 | C2 | B0 | B1 | B2 | SPEED RATIO | STEPPING RATIO |
|---|---|---|---|---|---|---|---|---|
| 1st | ◎ | ○ | | | | ○ | 2.804 | 1.54 |
| 2nd | ◎ | ○ | | | ○ | | 1.531 | 1.53 |
| 3rd | ◎ | ○ | ○ | | | | 1.000 | 1.42 |
| 4th | | ○ | ○ | ◎ | | | 0.705 | SPREAD 3.977 |
| R | | | ○ | | | ○ | 2.393 | |
| N | ○ | | | | | | | |

○ ENGAGED
◎ ENGAGED FOR STEP-VARIABLE SHIFTING, AND RELEASED FOR CONTINUOUSLY-VARIABLE SHIFTING

DRIVE DEVICE FOR VEHICLE AND METHOD OF ASSEMBLING THE SAME

TECHNICAL FIELD

The present invention relates to a vehicular drive system including a first electric motor, a differential portion, a second electric motor and a transmission portion, and a method of assembling the vehicular drive system, and more particularly to techniques for reducing the axial dimension of the vehicular drive system and improving accuracy of assembling of the vehicular drive system.

BACKGROUND ART

There is known a vehicular drive system including a first electric motor, a differential portion, a second electric motor, and a transmission portion. Patent Document discloses an example of such a drive system for use on a hybrid vehicle. In the hybrid vehicle drive system disclosed in this publication, the first electric motor, differential portion, second electric motor and transmission portion are disposed coaxially with each other, such that they are arranged in the axial direction of the drive system in the order of description. Accordingly, the required axial dimension and width dimension of this vehicular drive system tend to be large. In particular, where the vehicular drive system is transversely installed on an FF (front-engine front-drive) vehicle or an RR (rear-engine rear drive) vehicle, this transverse installation of the drive system is difficult due to a limited space available for installation of the drive system on the FF or RR vehicle. Where the drive system including the transmission portion as described above is installed on a hybrid vehicle known as "PRIUS" (registered trademark), for example, an extensive analysis is required regarding the layout of the components of the drive system, so that the drive system can be installed within the limited width dimension of the hybrid vehicle. It is also noted that among an increased number of components of the drive system, the electric motors and the transmission portion that are assembled together have a relatively large number of restrictions in the assembling, so that the overall efficiency of assembling of the drive system tends to be considerably lowered. Thus, there has been a need for providing a vehicular drive system which has a reduced axial dimension and an improved accuracy of assembling.

Patent Document 1: 1JP-2003-301731A

It is considered to provide a vehicular drive system which has a plurality of parallel axes and in which the first electric motor, differential portion, second electric motor and transmission portion are arranged in a plurality of power transmitting paths on the respective parallel axes. However, no techniques have been available for adequately laying out the components of this type of vehicular drive system, which components include the first electric motor, differential portion, second electric motor and transmission portion. A mere arrangement of the components on the plurality of parallel axes does not permit sufficient reduction of the axial dimension of the drive system, and has a risk of deterioration of accuracy and efficiency of assembling of the drive system.

DISCLOSURE OF THE INVENTION

The present invention was made in view of the background art described above. It is therefore an object of the present invention to provide a vehicular drive system which has a reduced axial dimension and an improved efficiency of assembling. Another object of the invention is to provide a method of assembling such a vehicular drive system.

One of the objects indicated above may be achieved by the present invention according to claim 1, which provides a vehicular drive system including a differential portion operable to distribute a drive force received by an input rotary member to a first electric motor and a power transmitting member, a second electric motor disposed in a power transmitting path between the power transmitting member and a drive wheel of a vehicle, and a transmission portion disposed between the power transmitting member and the drive wheel, the vehicular drive system being characterized in that: (a) the first electric motor, differential portion and second electric motor are disposed on a first axis about which the input rotary member is rotated, (b) the transmission portion is disposed on a second axis parallel to the first axis, (c) one axial portion of the first electric motor is covered by a cap-shaped first casing portion, (d) a cylindrical second casing portion is disposed adjacent to the first casing portion and cooperates with the first casing portion to define a first accommodating chamber in which the first electric motor is accommodated, (e) a cylindrical third casing portion is disposed adjacent to and on one side of the second casing portion remote from the first casing portion, and cooperates with the second casing portion to define a second accommodating chamber in which the differential portion and the second electric motor, and a third accommodating chamber in which the transmission portion is accommodated, (f) a cap-shaped fourth casing portion is disposed adjacent to the third casing portion and cooperates with the third casing portion to define a fourth accommodating chamber in which the drive linkage is accommodated, and (g) the first, second, third and fourth casing portions are connected to each other to constitute a housing.

A form of the invention according to claim 2 of the invention of claim 1 is characterized in that a rotor of the first electric motor is rotatably supported by the first casing portion and the second casing portion.

A form of the invention according to claim 2 of the invention of claim 1 or 2, is characterized in that a rotor of the second electric motor is rotatably supported by the third casing portion.

A form of the invention according to claim 4 of the invention of any one of claims 1-3 is characterized by further comprising (a) a hydraulically operated differential limiting device provided in the differential portion, for selectively switching the differential portion between a differential state and a non-differential state, and in that (b) a working oil is supplied to the hydraulically operated differential limiting device through an oil passage formed through the second casing portion.

A form of the invention according to claim 5 of the invention of any one of claims 1-4 is characterized in that (a) the transmission portion is placed in a selected one of operating positions by a selected combination of engaged and released states of a plurality of hydraulically operated frictional coupling devices, and in that (b) a working oil is supplied to the hydraulically operated frictional coupling devices through an oil passage formed through the second casing portion.

In a form of the invention according to claim 6 of the invention of any one of claims 1-5, the third casing portion includes a radially inwardly extending support wall which rotatably supports a rotor of the second electric motor.

A form of the invention according to claim 7 of the invention of any one of claims 1-6 is characterized in that (a) the drive linkage consists of a drive gear disposed on the first axis and a driven gear which is disposed on the second axis and driven by the drive gear, and in that (b) the drive gear is rotatably supported by a support wall radially inwardly extending from the third casing portion, while the driven gear is rotatably supported by a support member fitted in the third casing portion.

In a form of the invention according to claim 8 of the invention of any one of claims 1-7, (a) the differential portion cooperates with the first electric motor and the second electric motor to constitute an electrically controlled continuously variable transmission portion a speed ratio of which is continuously variable.

In a form of the invention according to claim 9, a rotary member located at one end portion of the first axis remote from the input rotary member and a rotary member at one end portion of the second axis remote from the input rotary member are connected to each other through the drive linkage.

The other object may be achieved by the invention according to claim 10, which provides a method of assembling a vehicular drive system including a differential portion operable to distribute a drive force received by an input rotary member to a first electric motor and a power transmitting member, a second electric motor disposed in a power transmitting path between the power transmitting member and a drive wheel of a vehicle, and a transmission portion disposed between the power transmitting member and the drive wheel; the power transmitting path including two parts which are formed in series with each other, respectively along a first axis that is an axis of rotation of the input rotary member, and a second axis parallel to the first axis, the transmission portion being disposed on the second axis, the method being characterized by comprising (a) an assembling step of assembling together a first separate casing and a second separate casing which are a plurality of cylindrical casing portions arranged in a direction of the first and second axes, (b) a transmission-portion installing step of installing frictional coupling devices and planetary gear sets of the transmission portion in the first and second separate casings assembled together in the assembling step, through an open end of the second separate casing, and (c) a support-member fitting step of fitting a support member in the open end of the second separate casing, for rotatably supporting the transmission portion which has been installed through the open end in the transmission-portion installing step.

In a form of the invention according to claim 11 of the invention of claim 10, the support member has a clutch engaging oil passage for operating the frictional coupling devices.

In a form of the invention according to claim 12 of the invention of claim 10 or 11, (a) a drive gear connected to the power transmitting member is disposed on the first axis, and (b) the support member supports a driven gear rotated by the drive gear, such that the driven gear is rotatable about the second axis.

In the vehicular drive system of the above-described invention according to claim 1, (a) the first electric motor, differential portion and second electric motor are disposed on a first axis about which the input rotary member is rotated, (b) the transmission portion is disposed on a second axis parallel to the first axis, (c) one axial portion of the first electric motor is covered by a cap-shaped first casing portion, (d) a cylindrical second casing portion is disposed adjacent to the first casing portion and cooperates with the first casing portion to define a first accommodating chamber in which the first electric motor is accommodated, (e) a cylindrical third casing portion is disposed adjacent to and on one side of the second casing portion remote from the first casing portion, and cooperates with the second casing portion to define a second accommodating chamber in which the differential portion and the second electric motor, and a third accommodating chamber in which the transmission portion is accommodated, (f) a cap-shaped fourth casing portion is disposed adjacent to the third casing portion and cooperates with the third casing portion to define a fourth accommodating chamber in which the drive linkage is accommodated, and (g) the first, second, third and fourth casing portions are connected to each other to constitute a housing. In the present vehicular drive system, the first electric motor, differential portion and second electric motor are disposed on the first axis, while the transmission portion is disposed on the second axis parallel to the first axis. A rotary member located at an end portion of the first axis remote from the input rotary member and a rotary member at an end portion of the second axis remote from the input rotary member are connected to each other through the drive linkage, so that the axial dimension of the first electric motor, differential portion and second electric motor disposed on the first axis and the axial dimension of the transmission portion disposed on the second axis can be made substantially equal to each other, whereby the axial dimension of the drive system can be desirably reduced. Further, the housing of the vehicular drive system consists of the mutually separate first, second, third and fourth casing portions, so that the drive system can be easily assembled.

In the vehicular drive system of the above-described invention according to claim 2, the rotor of the first electric motor which has a comparatively large dimension in the direction of the first axis is rotatably supported by the first casing portion and the second casing portion, so that the rotor of the first electric motor can be supported at its two axial portions, whereby the vehicular drive system can be assembled with higher efficiency.

In the vehicular drive system of the above-described invention according to claim 3, the rotor of the second electric motor which has a comparatively large dimension in the direction of the first axis is rotatably supported by the third casing portion, so that the second electric motor is accommodated in the third casing portion, whereby the vehicular drive system can be assembled with higher efficiency.

The vehicular drive system of the above-described invention according to claim 4 is characterized (a) by further comprising the hydraulically operated differential limiting device provided in the differential portion, for selectively switching the differential portion between the differential state and the non-differential state, and (b) in that the working oil is supplied to the hydraulically operated differential limiting device through the oil passage formed through the second casing portion. In this case, the axial dimension of the vehicular drive system can be made shorter than in the case where the oil passage is formed through an additional member.

The vehicular drive system of the above-described invention according to claim 5 is characterized in that (a) the transmission portion is placed in a selected one of the operating positions by the selected combination of engaged and released states of the plurality of hydraulically operated frictional coupling devices, and in that (b) the working oil is supplied to the hydraulically operated frictional coupling devices through then oil passage formed through the second casing portion. In this case, the axial dimension of the vehicular drive system can be made shorter than in the case where the oil passage is formed through an additional member.

In the vehicular drive system of the above-described invention according to claim 6, the third casing portion includes a radially inwardly extending support wall which rotatably supports a rotor of the second electric motor, so that the rotor of the second electric motor can be rotatably supported at its two axial portions, whereby the vehicular drive system can be assembled with higher efficiency.

The vehicular drive system of the above-described invention according to claim 7 is characterized in that (a) the drive linkage consists of the drive gear disposed on the first axis and the driven gear which is disposed on the second axis and driven by the drive gear, and in that (b) the drive gear is rotatably supported by the support wall radially inwardly extending from the third casing portion, while the driven gear is rotatably supported by the support member fitted in the third casing portion. Accordingly, the drive gear and the driven gear are rotatably supported respectively by the third casing portion and the support member fitted in the third casing portion. Like the transmission portion described above, the third support member can be inserted into the third casing portion and thereby fitted into the third casing portion, through the rear opening of the third casing portion, whereby the drive system can be easily assembled.

In the vehicular drive system of the above-described invention according to claim 8, characterized in that said differential portion cooperates with said first electric motor and said second electric motor to constitute an electrically controlled continuously variable transmission portion a speed ratio of which is continuously variable. Accordingly, the vehicle can be run with the drive system placed in its step-variable or continuously-variable shifting state. The drive system is placed in the step-variable shifting state during a high-speed or high-load running of the vehicle, and placed in the continuously-variable shifting state during a low- or medium-speed running or a low-load running of the vehicle, whereby the fuel economy of the vehicle can be effectively improved.

In the vehicular drive system of the above-described invention according to claim 9, the rotary member located at one end portion of the first axis remote from the input rotary member and the rotary member at one end portion of the second axis remote from the input rotary member are connected to each other through the drive linkage, so that the drive force is transmitted from the side of the first axis to the side of the second axis through the drive linkage.

The method of the above-described invention according to claim 10 comprises (a) the assembling step of assembling together the first separate casing and the second separate casing which are a plurality of cylindrical casing portions arranged in the direction of the first and second axes, (b) the transmission-portion installing step of installing the frictional coupling devices and planetary gear sets of the transmission portion in the first and second separate casings assembled together in the assembling step, through the open end of the second separate casing, and (c) the support-member fitting step of fitting the support member in the open end of the second separate casing, for rotatably supporting the transmission portion which has been installed through the open end in the transmission-portion installing step. According to this method, the transmission portion which has a large axial dimension and which includes the separate planetary gear sets and frictional coupling devices is inserted and installed in the housing through the open end of the second separate casing, so that the vehicular drive system can be assembled with reduced assembling efforts and improved efficiency of assembling.

In the method of the above-described invention according to claim 11, the support member has a clutch engaging oil passage for operating the frictional coupling devices. In this case, the drive system can be assembled with higher efficiency than in the case where the clutch engaging oil passage is formed in an additional member such as a support wall.

In the method of the above-described invention according to claim 12, (a) the drive gear connected to the power transmitting member is disposed on the first axis, and (b) the support member supports the driven gear rotated by the drive gear, such that the driven gear is rotatable about the second axis. In this case, the drive system can be assembled with higher efficiency, than in the case where the driven gear is supported rotatably about the second axis, by an additional member.

BRIEF DESCRIPTION OF THE DRAWINGS

FIG. 22 is a table indicating gear positions of an automatic transmission of the embodiment of FIG. 21, which are established by engaging actions of respective different combinations of hydraulically operated frictional coupling devices;

FIG. 24 is a table indicating gear positions of an automatic transmission in the embodiment of FIG. 23, which are established by engaging actions of respective different combinations of hydraulically operated frictional coupling devices.

EXPLANATION OF REFERENCE SIGNS

Figure 1:
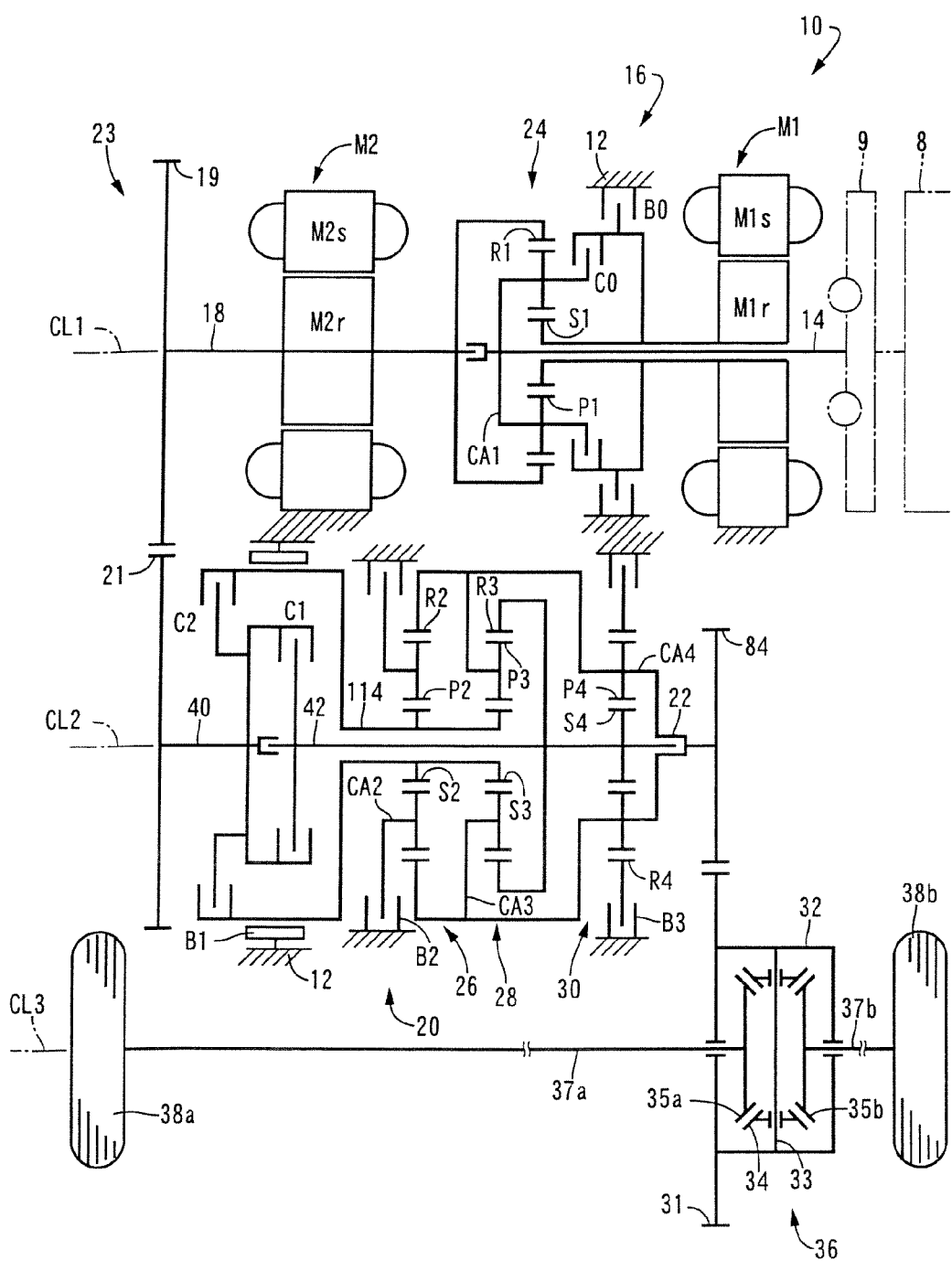
FIG. 1 is a schematic view showing a drive system for a hybrid vehicle, which is constructed according to one embodiment of the present invention.

10: Vehicular drive system
12: Transaxle housing (Housing)
12a: First casing portion
12b: Second casing portion (First separate casing)
12c: Third casing portion (Second separate casing)
12d: Fourth casing portion
14: Input rotary member
16: Power distributing mechanism (Differential portion)
18: Power transmitting member
19: Drive gear
20: Step-variable automatic transmission (Transmission portion)
21: Driven gear
23: Drive linkage
96: Support wall
98: Support wall
104: Support member
121: Opening
140: Oil passage
184: Clutch engaging oil passage
M1: First electric motor
M1r: Rotor
M2: Second electric motor
M2r: Rotor
CL1, CL2, CL3: First axis, second axis and third axis
C0: Switching clutch (Hydraulically operated differential limiting device)
B0: Switching brake (Hydraulically operated differential limiting device)

K3: Third step (Assembling step)
K4: Fourth step (Transmission-portion installing step)
K5: Fifth step (Support-member fitting step)

BEST MODE FOR CARRYING OUT THE INVENTION

Referring to the drawings, there will be described in detail the preferred embodiments of the present invention.

Embodiment 1

Referring first to the schematic view of FIG. 1, there is shown a drive system 10 for a hybrid vehicle, which is constructed according to one embodiment of this invention. The drive system 10 shown in FIG. 1 includes: an engine 8; a transaxle housing 12 (hereinafter referred to simply as "housing 12"), which is a stationary member attached to the body of the vehicle; a pulsation absorbing damper (vibration damping device) 9; a first input shaft in the form of an input rotary member 14 connected to the engine 8 through the pulsation absorbing damper 9 and receiving an output of the engine 8 through the pulsation absorbing damper 9; a first electric motor M1; a hydraulically operated differential limiting device in the form of a switching clutch C0 and a switching brake B0; a differential gear mechanism or differential portion in the form of a power distributing mechanism 16 connected to the input rotary member 14; a power transmitting member 18 disposed downstream of the first input shaft; a second electric motor M2; a step-variable transmission in the form of an automatic transmission portion 20; and a second input shaft in the form of an output rotary member 22. The above-indicated components 9, 14, M1, C0, B0, 16, 18, M2, 20, 22 are all accommodated within the housing 12, and the components 9, 14, M1, C0, B0, 16, 18 and M2 are disposed coaxially with each other on a first axis CL1, while the components 20 and 22 are disposed coaxially with each other on a second axis CL2 parallel to the first axis CL1. A drive gear 19 located at one axial end of the first axis CL1, and a driven gear 21 located at one axial end of the second axis CL2 and meshing with the drive gear 19 cooperate to constitute a drive linkage 23, which is a part of a power transmitting path between the engine 8 and the output rotary member 22. The automatic transmission portion 20 is disposed in a part of the power transmitting path between the power distributing mechanism 16 and the output rotary member 22, such that the automatic transmission portion 20 is connected in series with the power distributing mechanism 16 through the power transmitting member 18.

The vehicular drive system 10 is suitably installed transversely on an FF (front-engine front-drive) hybrid vehicle, such that the vehicular drive system 10 is disposed between a vehicle drive power source in the form of the engine 8 and a pair of drive wheels (front wheels) 38a, 38b. The output of the engine 8 is transmitted to the drive wheels 38a, 38b through a final reduction gear device (differential gear unit) 36 and a pair of axles 37a, 37b. The final reduction gear device 36 is provided to distribute a torque evenly to the two drive wheels 38a, 38b while permitting them to rotate at different speeds, and includes: a large-diameter gear 31 rotatable about a third axis CL3 parallel to the first and second axes CL1, CL2; a differential casing 32 rotatable with the large-diameter gear 31; a pair of differential small gears 34 supported by a pin 33 fixed to the differential casing 32 perpendicularly to the third axis CL3, such that the differential small gears 34 are rotatable about an axis of the pin 33; and a pair of differential large gears 35*a*, 35*b* which are fixed to the respective axes 37*a*, 37*b* and which mesh with the respective differential small gears 34.

The power distributing mechanism 16 is a mechanism arranged to mechanically distribute the output of the engine 8 to the first electric motor M1 and the power transmitting member 18, and to mechanically synthesize the output of the engine 8 and the output of the first electric motor M1 into a drive force to be transmitted to the power transmitting member 18. In the present embodiment, the first and second electric motors M1, M2 have respective stators M1$s$, M2$s$, and respective rotors M1$r$, M2$r$, and each of these motors M1, M2 is a so-called motor/generator operable also as an electric generator. However, the first electric motor M1 is required to function at least as an electric generator capable of generating a reaction force, while the second electric motor M2 is required to function at least as a vehicle drive motor operable to generate a vehicle drive force.

The power distributing mechanism 16 includes a first planetary gear set 24 of single pinion type having a gear ratio $\rho 1$ of about 0.418, for example, and is switchable by the switching clutch C0 and the switching brake B0, between a selected one of a differential state and a non-differential state. The first planetary gear set 24 has rotary elements (elements) consisting of a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio $\rho 1$ is represented by ZS1/ZR1.

In the power distributing mechanism 16, the first carrier CA1 is connected to the input rotary shaft 14, that is, to the engine 8, and the first sun gear S1 is connected to the rotor M1$r$ of the first electric motor M1, while the first ring gear R1 and the rotor M2$r$ of the second electric motor M2 are connected to the power transmitting member 18. The switching brake B0 is disposed between the first sun gear S1 and the housing 12, and the switching clutch C0 is disposed between the first sun gear S1 and the first carrier CA1. When the switching clutch C0 and brake B0 are both released, the power distributing mechanism 16 is placed in the differential state in which the first sun gear S1, first carrier CA1 and first ring gear R1 are rotatable relative to each other, so as to perform a differential function, so that the output of the engine 8 is distributed to the first electric motor M1 and the power transmitting member 18, whereby a portion of the output of the engine 8 which is distributed to the first electric motor M1 is used to drive the first electric motor M1 to generate an electric energy which is stored or used to drive the second electric motor M2. Accordingly, the power distributing mechanism 16 is placed in a continuously-variable shifting state in which the rotating speed of the power transmitting member 18 is continuously variable, irrespective of the rotating speed of the engine 8, namely, in the differential state or continuously-variable shifting state in which the power distributing mechanism 16 functions as an electrically controlled continuously variable transmission whose speed ratio $\gamma 0$ (rotating speed of the input rotary member 14/rotating speed of the power transmitting member 18) is continuously variable from a minimum value $\gamma 0 min$ to a maximum value $\gamma 0 max$.

When the switching clutch C0 is engaged during running of the vehicle by the output of the engine 8 while the power distributing mechanism 16 is placed in the continuously-variable shifting state, the first sun gear S1 and the first carrier CA1 are connected together, so that the power distributing mechanism 16 is brought into the non-differential state, namely, in the locked state in which the three rotary elements of the first planetary gear set 24 consisting of the first sun gear S1, first carrier CA1 and first ring gear R1 are rotatable as a unit. In this non-differential state in which the rotating speed of the engine 8 and the rotating speed of the power transmitting member 18 are made equal to each other, the power distributing mechanism is placed in a fixed-speed-ratio shifting state in which the power distributing mechanism 16 functions as a transmission having a fixed speed ratio $\gamma 0$ equal to 1. When the switching brake B0 is engaged in place of the switching clutch C0, the power distributing mechanism 16 is placed in the non-differential or locked state in which the first sun gear S1 is not rotatable, so that the rotating speed of the first ring gear R1 is made higher than that of the first carrier CA1, whereby the power distributing mechanism 16 is placed in the fixed-speed-ratio shifting state in which the power distributing mechanism 16 functions as a speed-increasing transmission having a fixed speed ratio $\gamma 0$ smaller than 1, for example, about 0.7. In the present embodiment described above, the switching clutch C0 and brake B0 function as a differential-state switching device operable to selectively place the power distributing mechanism 16 in the differential state (continuously-variable shifting state) in which the power distributing mechanism 16 functions as an electrically controlled continuously variable transmission the speed ratio of which is continuously variable, and in the non-differential state, namely, in the locked state in which the first planetary gear set 24 does not function as the electrically controlled continuously variable transmission having the continuously-variable shifting function, that is, in the fixed-speed-ratio shifting state in which the first planetary gear set 24 functions as a transmission having a single gear position with one speed ratio or a plurality of gear positions with respective speed ratios. As described above, the switching clutch C0 and the switching brake B0 also function as the hydraulically operated differential limiting device operable to limit the differential function of the power distributing mechanism 16, that is, the differential function of the first planetary gear set 24.

The drive gear 19 is fixed to one of opposite axial end portions of the power transmitting member 18, which is remote from the engine 8, while the driven gear 21 meshing with the drive gear 19 is fixed to one axial end portion of a first intermediate shaft 40, so that a rotary motion of the power transmitting member 18 is transmitted to the automatic transmission portion 20 through the first intermediate shaft 40. The automatic transmission portion 20 is provided with a first clutch C1 through which a rotary motion of the first intermediate shaft 40 is transmitted to a second intermediate shaft 42, and a second clutch C2 through which the rotary motion of the first intermediate shaft 40 is transmitted to a tubular sun gear shaft 114.

The automatic transmission portion 20 includes a plurality of hydraulically operated frictional coupling devices, and a plurality of planetary gear sets which are a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio $\rho 2$ of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio ρ3 of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio ρ4 of about 0.424. Where the numbers of teeth of the second sun gear S2, second ring gear R2, third sun gear S3, third ring gear R3, fourth sun gear S4 and fourth ring gear r4 are represented by ZS2, ZR2, ZS3, ZR3, ZS4 and ZR4, respectively, the above-indicated gear ratios ρ2, ρ3 and ρ4 are represented by ZS2/ZR2. ZS3/ZR3, and ZS4/ZR4, respectively. The sun gears S, ring gears R and planetary gears P are all helical gears.

In the automatic transmission portion 20, the second sun gear S2 and the third sun gear S3 are integrally fixed to each other as a unit, selectively connected to the power transmitting member 18 through the above-indicated second clutch C2, and selectively fixed to the housing 12 through a first brake B1. The second carrier CA2 is selectively fixed to the housing 12 through a second brake B2, and the fourth ring gear R4 is selectively fixed to the housing 12 through a third brake B3, while the second ring gear R2, third carrier CA3 and fourth carrier CA4 are integrally fixed to each other and fixed to the output rotary member 22. The third ring gear R3 and the fourth sun gear S4 are integrally fixed to each other and selectively connected to the power transmitting member 18 through the above-indicated first clutch C1.

The above-described switching clutch C0, first clutch C1, second clutch C2, switching brake B0, first brake B1, second brake B2 and third brake B3 are hydraulically operated frictional coupling devices used in a conventional vehicular automatic transmission. Each of these frictional coupling devices except the first brake B1 is constituted by a wet-type multiple-disc coupling device including a plurality of friction plates which are superposed on each other and which are forced against each other by a hydraulic actuator. The first brake B1 is a band brake including a rotary drum and one band or two bands which is/are wound on the outer circumferential surface of the rotary drum and tightened at one end by a hydraulic actuator.

Figures 2, 3:
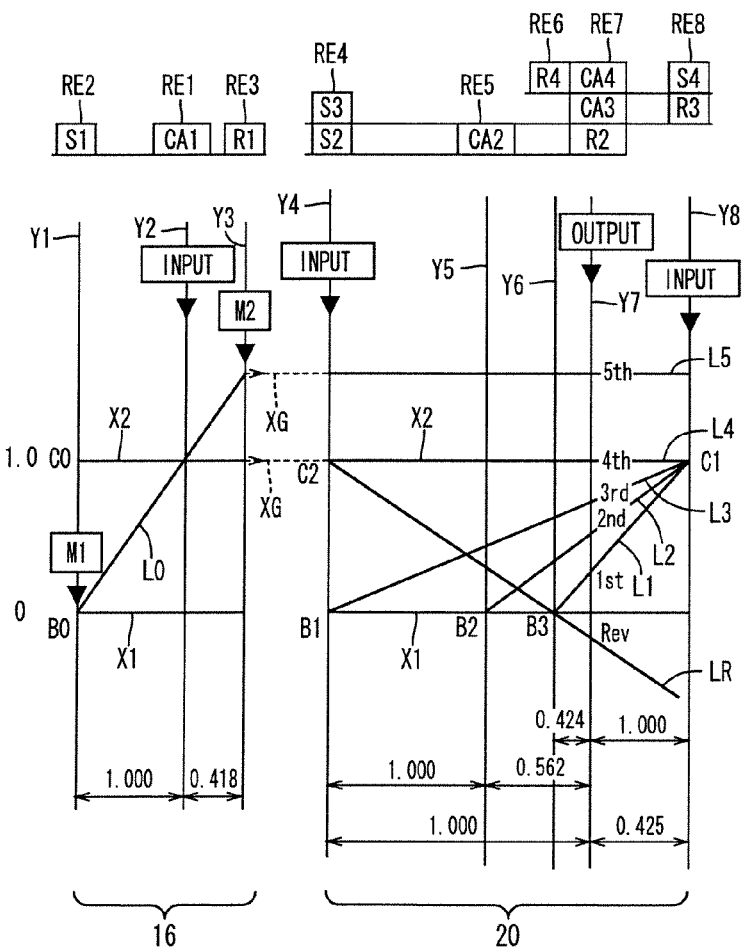
FIG. 2 is a table indicating shifting actions of the drive system of the hybrid vehicle of the embodiment of FIG. 1 operable in a selected one of a continuously-variable shifting state and a step-variable shifting state, in relation to different combinations of operating states of hydraulically operated frictional coupling devices to effect the respective shifting actions.
FIG. 3 is a collinear chart indicating relative rotating speeds of rotary elements of the drive system of the hybrid vehicle of the embodiment of FIG. 1 operated in the step-variable shifting state, in different gear positions of the drive system.

In the drive system 10 constructed as described above, one of a first gear position (first speed position) through a fifth gear position (fifth speed position), a reverse gear position (rear drive position) and a neural position is selectively established by engaging actions of a corresponding combination of the frictional coupling devices selected from the above-described switching clutch C0, first clutch C1, second clutch C2, switching brake B0, first brake B1, second brake B2 and third brake B3, as indicated in the table of FIG. 2. Those gear positions have respective speed ratios γ (input shaft speed $N_{IN}$/output shaft speed $N_{OUT}$) which change as geometric series. In particular, it is noted that the power distributing mechanism 16 is provided with the switching clutch C0 and brake B0, so that the power distributing mechanism 16 can be selectively placed by engagement of the switching clutch C0 or switching brake B0, in the fixed-speed-ratio shifting state in which the power distributing mechanism 16 is operable as a transmission having a single gear position with one speed ratio or a plurality of gear positions with respective speed ratios, as well as in the continuously-variable shifting state in which the power distributing mechanism 16 is operable as a continuously variable transmission, as described above. In the present vehicular drive system 10, therefore, a step-variable transmission is constituted by the automatic transmission portion 20, and the power distributing mechanism 16 which is placed in the fixed-speed-ratio shifting state by engagement of the switching clutch C0 or switching brake B0. Further, a continuously variable transmission is constituted by the automatic transmission portion 20, and the power distributing mechanism 16 which is placed in the continuously-variable shifting state, with none of the switching clutch C0 and brake B0 being engaged.

Where the drive system 10 functions as the step-variable transmission, for example, the first gear position having the highest speed ratio γ1 of about 3.357, for example, is established by engaging actions of the switching clutch C0, first clutch C1 and third brake B3, and the second gear position having the speed ratio γ2 of about 2.180, for example, which is lower than the speed ratio γ1, is established by engaging actions of the switching clutch C0, first clutch C1 and second brake B2, as indicated in FIG. 2. Further, the third gear position having the speed ratio γ3 of about 1.424, for example, which is lower than the speed ratio γ2, is established by engaging actions of the switching clutch C0, first clutch C1 and first brake B1, and the fourth gear position having the speed ratio γ4 of about 1.000, for example, which is lower than the speed ratio γ3, is established by engaging actions of the switching clutch C0, first clutch C1 and second clutch C2. The fifth gear position having the speed ratio γ5 of about 0705, for example, which is smaller than the speed ratio γ4, is established by engaging actions of the first clutch C1, second clutch C2 and switching brake B0. Further, the reverse gear position having the speed ratio γR of about 3.209, for example, which is intermediate between the speed ratios γ1 and γ2, is established by engaging actions of the second clutch C2 and the third brake B3. The neutral position N is established by engaging only the switching clutch C0.

Where the drive system 10 functions as the continuously-variable transmission, on the other hand, the switching clutch C0 and the switching brake B0 are both released, as indicated in FIG. 2, so that the power distributing mechanism 16 functions as the continuously variable transmission, while the automatic transmission portion 20 connected in series to the power distributing mechanism 16 functions as the step-variable transmission, whereby the speed of the rotary motion transmitted to the automatic transmission portion 20 placed in one of the first, second, third and fourth gear positions, namely, the rotating speed of the power transmitting member 18 is continuously changed, so that the speed ratio when the automatic transmission portion 20 is placed in one of those gear positions is continuously variable over a predetermined range. Accordingly, the speed ratio of the automatic transmission portion 20 is continuously variable across the adjacent gear positions, whereby the overall speed ratio γT of the drive system 10 is continuously variable.

The collinear chart of FIG. 3 indicates, by straight lines, a relationship among the rotating speeds of the rotary elements in each of the gear positions of the drive system 10, which is constituted by the power distributing mechanism 16 functioning as the continuously-variable shifting portion or first shifting portion, and the automatic transmission portion 20 functioning as the step-variable shifting portion or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines X1, X2, XG, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18. Three vertical lines Y1, Y2 and Y3 correspond to three elements of the power distributing mechanism 16, and respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the automatic transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines Y4-Y8 are determined by the gear ratios ρ2, ρ3 and ρ4 of the second, third and fourth planetary gear sets 26, 28, 30. Therefore, as shown in FIG. 3, the distance between the vertical lines corresponding to the sun gear and carrier of each of the second, third and fourth planetary gear sets 26, 28, 30 corresponds to "1", while the distance between the vertical lines corresponding to the carrier and ring gear corresponds to the gear ratio ρ.

Referring to the collinear chart of FIG. 3, the power distributing mechanism 16 (continuously-variable transmission portion) of the drive system 10 is arranged such that the first rotary element RE1 (first carrier CA1) which is one of the three rotary elements (elements) of the first planetary gear set 24, is fixed to the input rotary member 14, and is selectively connected to one of the other rotary elements, that is, to the first sun gear S1 through the switching clutch C0, and this second rotary element RE2 (first sun gear S1) is connected to the first electric motor M1 and selectively fixed to the housing 12 through the switching brake B0, while the third rotary element RE3 (first ring gear R1) which is the remaining rotary element is fixed to the power transmitting member 18 and connected to the second electric motor M2, so that a rotary motion of the differential mechanism input rotary member 14 is transmitted to the automatic transmission (step-variable transmission portion) 20 through the power transmitting member 18. A relationship between the rotating speeds of the first sun gear S1 and the first ring gear R1 is represented by an inclined straight line L0 which passes a point of intersection between the lines Y2 and X2.

Figure 4:
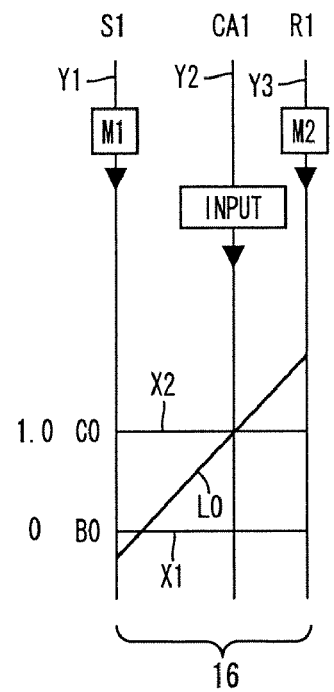
FIG. 4 is a view showing an example of an operating state of a power distributing mechanism of the drive system placed in the continuously-variable shifting state, the view corresponding to a part of the collinear chart of FIG. 3 which shows the power distributing mechanism.
Figure 5:
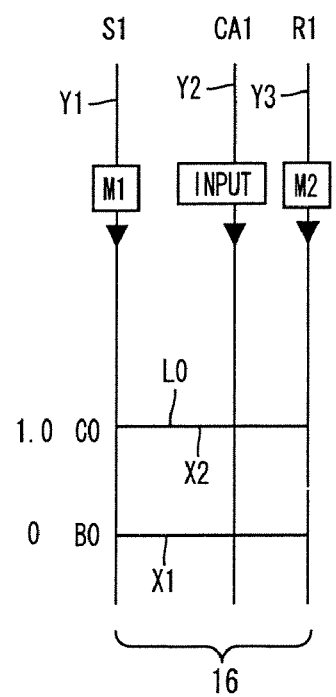
FIG. 5 is a view showing the operating state of the power distributing mechanism placed in the step-variable shifting state by engagement of a switching clutch C0, the view corresponding to the part of the collinear chart of FIG. 3 which shows the power distributing mechanism.

FIGS. 4 and 5 correspond to a part of the collinear chart of FIG. 3 which shows the power distributing mechanism 16. FIG. 4 shows an example of an operating state of the power distributing mechanism 16 placed in the continuously-variable shifting state with the switching clutch C0 and the switching brake B0 held in the released state. The rotating speed of the first sun gear S1 represented by the point of intersection between the straight line L0 and vertical line Y1 is raised or lowered by controlling the reaction force generated by an operation of the first electric motor M1 to generate an electric energy, so that the rotating speed of the first ring gear R1 represented by the point of intersection between the lines L0 and Y3 is lowered or raised.

FIG. 5 shows an operating state of the power distributing mechanism 16 placed in the step-variable shifting state with the switching clutch C0 held in the engaged state. When the first sun gear S1 and the first carrier CA1 are connected to each other, the three rotary elements indicated above are rotated as a unit, so that the straight line L0 is aligned with the horizontal line X2, whereby the power transmitting member 18 is rotated at a speed equal to the engine speed $N_E$. When the switching brake B0 is engaged, on the other hand, the rotation of the first sun gear S1 is stopped, so that the straight line L0 is inclined in the state indicated in FIG. 3, whereby the rotating speed of the first ring gear R1, that is, the rotation of the power transmitting member 18 represented by a point of intersection between the lines L0 and Y3 is made higher than the engine speed $N_E$ and transmitted to the automatic transmission portion 20.

In the automatic transmission portion 20, the fourth rotary element RE4 is selectively connected to the power transmitting member 18 through the second clutch C2, and selectively fixed to the housing 12 through the first brake B1, and the fifth rotary element RE5 is selectively fixed to the housing 12 through the second brake B2, while the sixth rotary element RE6 is selectively fixed to the housing 12 through the third brake B3. The seventh rotary element RE7 is integrally fixed to the drive system output rotary member 22, while the eighth rotary element RE8 is selectively connected to the power transmitting member 18 through the first clutch C1.

When the first clutch C1 and the third brake B3 are engaged, the automatic transmission portion 20 is placed in the first gear position. The rotating speed of the drive system output rotary member 22 in the first gear position is represented by a point of intersection between the vertical line Y7 indicative of the rotating speed of the seventh rotary element RE7 fixed to the drive system output rotary member 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1. Similarly, the rotating speed of the output rotary member 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output rotary member 22. The rotating speed of the output rotary member 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output rotary member 22. The rotating speed of the output rotary member 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output rotary member 22. In the first-speed through fourth gear positions in which the switching clutch C0 is placed in the engaged state, the eighth rotary element RE8 is rotated at the same speed as the engine speed $N_E$, with the drive force received from the power distributing mechanism 16, that is, from the power distributing mechanism 16. When the switching brake B0 is engaged in place of the switching clutch C0, the eighth rotary element RE8 is rotated at a speed higher than the engine speed $N_E$, with the drive force received from the power distributing mechanism 16. The rotating speed of the output rotary member 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output rotary member 22. The rotating speed of the output rotary member 22 in the reverse gear position established by the engaging actions of the second clutch C2 and the third brake B3 is represented by a point of intersection between an inclined straight line LR and the vertical line Y7.

Figure 6:
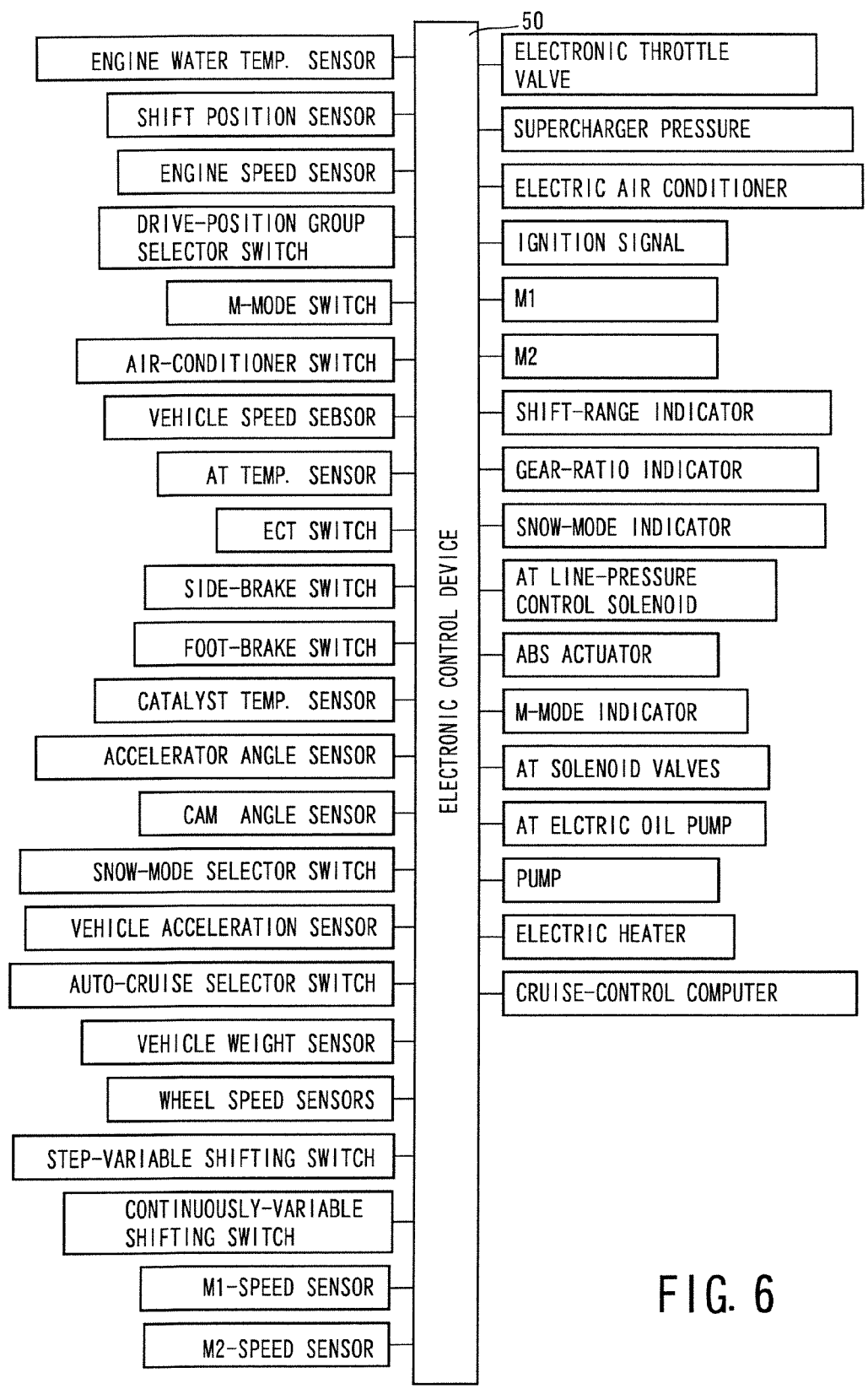
FIG. 6 is a view indicating input and output signals of an electronic control device provided in the drive system of the embodiment of FIG. 1.

FIG. 6 illustrates signals received by an electronic control device 50 provided to control the drive system 10, and signals generated by the electronic control device 50. This electronic control device 50 includes a so-called microcomputer incorporating a CPU, a ROM, a RAM and an input/output interface, and is arranged to process the signals according to programs stored in the ROM while utilizing a temporary data storage function of the RAM, to implement hybrid drive controls of the engine 8 and electric motors M1 and M2, and drive controls such as a shifting control of the automatic transmission portion 20.

The electronic control device 50 is arranged to receive, from various sensors and switches shown in FIG. 6, various signals such as: a signal indicative of a temperature of cooling water of the engine; a signal indicative of a selected operating position of a shift lever 58; a signal indicative of the operating speed $N_E$ of the engine 8; a signal indicative of a value indicating a selected group of forward-drive positions of the transmission mechanism; a signal indicative of an M mode (motor-drive mode); a signal indicative of an operated state of an air conditioner; a signal indicative of a vehicle speed corresponding to the rotating speed of the output rotary member 22; a signal indicative of a temperature of a working oil of the automatic transmission portion 20; a signal indicative of an operated state of a side brake; a signal indicative of an operated state of a foot brake; a signal indicative of a temperature of a catalyst; a signal indicative of an operating amount of an accelerator pedal; a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the power distributing mechanism 16 in the fixed-speed-ratio shifting state in which the drive system 10 functions as a step-variable transmission; a signal indicative of a continuously-variable shifting switch provided to place the power distributing mechanism 16 in the continuously variable-shifting state in which the drive system 10 functions as the continuously variable transmission; a signal indicative of a rotating speed $N_{M1}$ of the first electric motor M1; and a signal indicative of a rotating speed $N_{M2}$ of the second electric motor M2. The electronic control device 50 is further arranged to generate various signals such as: a signal to drive an electronic throttle actuator for controlling an angle of opening of a throttle valve; a signal to adjust a pressure of a supercharger; a signal to operate the electric air conditioner; a signal for controlling an ignition timing of the engine 8; signals to operate the electric motors M1 and M2; a signal to operate a shift-range indicator for indicating the selected operating position of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 provided to control the hydraulic actuators of the hydraulically operated frictional coupling devices of the power distributing mechanism 16 and the automatic transmission portion 20; a signal to operate an electric oil pump used as a hydraulic pressure source for the hydraulic control unit 42; a signal to drive an electric heater; and a signal to be applied to a cruise-control computer.

Figure 7:
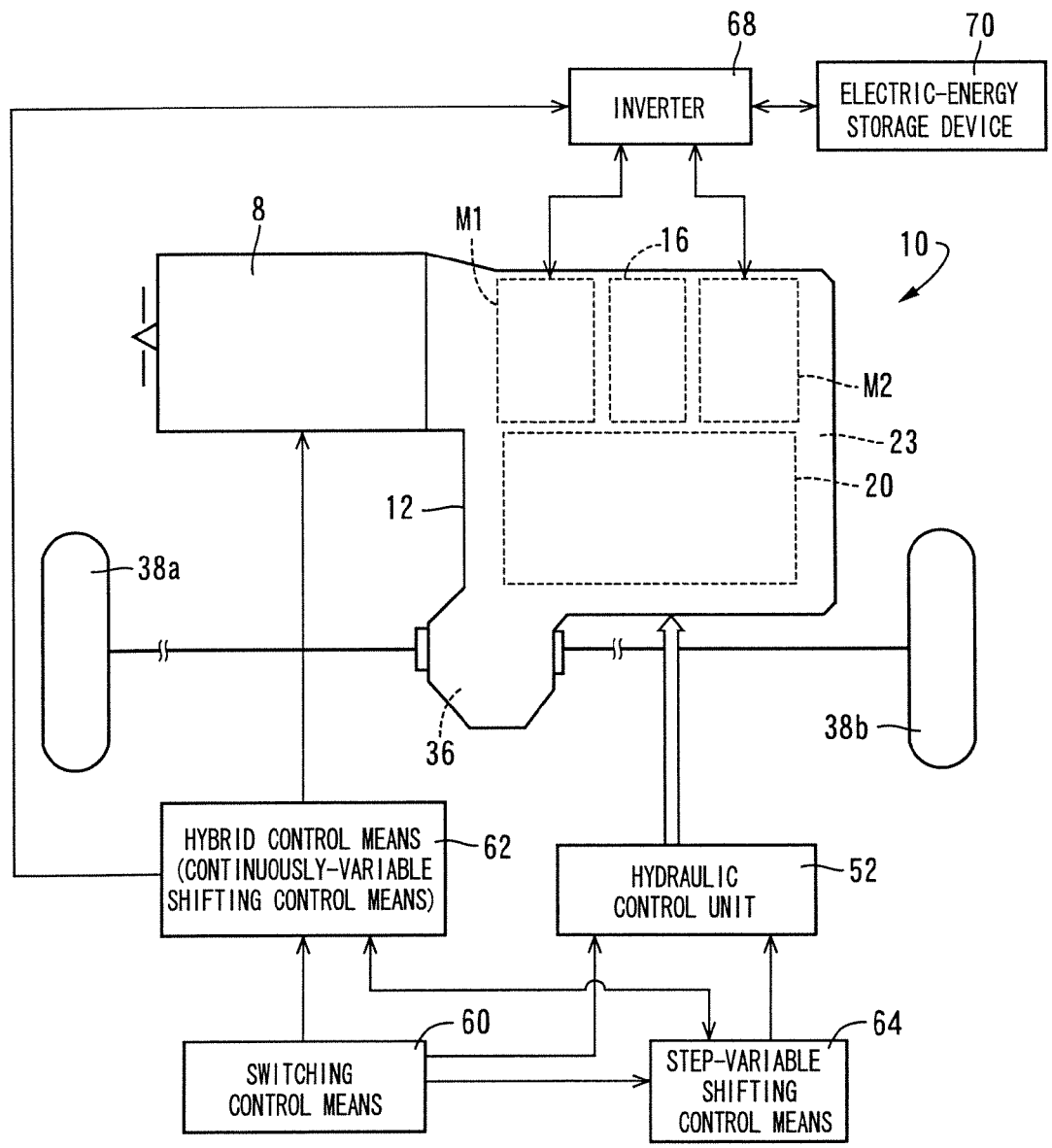
FIG. 7 is a functional block diagram illustrating major control functions performed by the electronic control device of FIG. 6.

FIG. 7 is a functional block diagram illustrating major control functions performed by the electronic control device 50. Switching control means 60 is arranged to determine whether the vehicle condition is in a continuously-variable shifting region in which the drive system 10 should be placed in the continuously-variable shifting state, or in a step-variable shifting region in which the drive system 10 should be placed in the step-variable shifting state. This determination is made on the basis of a stored predetermined relationship shown in FIG. 8 or 9, for example. Where the relationship shown in FIG. 8 (switching boundary line map) is used, the determination is made on the basis of the vehicle condition as represented by the actual engine speed $N_E$, and a drive-force-related value relating to the drive force of the hybrid vehicle, for example, an engine output torque $T_E$.

Figure 8:
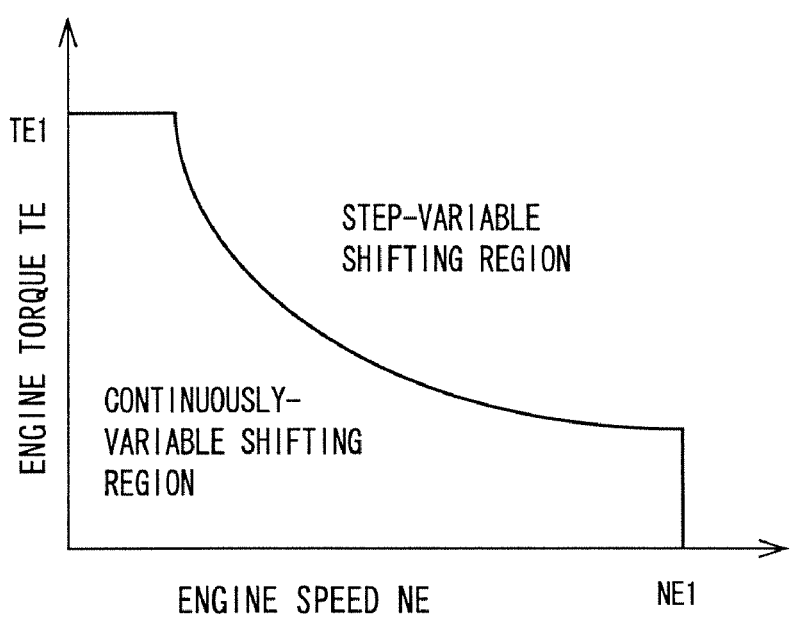
FIG. 8 is a view indicating a stored predetermined relationship used by the switching control means of FIG. 7 for switching between a continuously-variable shifting region and a step-variable shifting region.

According to the relationship shown in FIG. 8, the step-variable shifting region is set to be a high-torque region (a high-output running region in which the output torque $T_E$ of the engine 8 is not lower than a predetermined value TE1, or a high-speed region in which the engine speed $N_E$ is not lower than a predetermined value NE1, namely, a high-vehicle-speed region in which the vehicle speed which is one of the vehicle conditions and which is determined by the engine speed NE and the overall speed ratio γT is not lower than a predetermined value, or a high-output region in which the vehicle output calculated from the output torque $T_E$ and speed $N_E$ of the engine 8 is not lower than a predetermined value. Accordingly, the step-variable shifting control is effected when the vehicle is running with a comparatively high output torque or speed of the engine 8, or with a comparatively high vehicle output. The step-variable shifting control permits a change of the engine speed $N_E$ as a result of a shift-up action of the transmission, that is, a rhythmic change of the speed of the engine 8. Namely, the continuously-variable shifting state is switched to the step-variable shifting state (fixed-speed-ratio shifting state) when the vehicle is placed in a high-output running state in which a desire of the vehicle operator to increase the vehicle drive force should be satisfied rather a desired to improve the fuel economy. Accordingly, the vehicle operator can enjoy a comfortable rhythmic change of the engine speed $N_E$. On the other hand, the continuously-variable shifting control is effected when the vehicle is running with a comparatively low output torque or speed of the engine 8, or with a comparatively low vehicle output, that is, when the engine 8 is in a normal output state. A boundary line defining the step-variable shifting region and the continuously-variable shifting region in FIG. 8 corresponds to a high-vehicle speed determining line defined by a series of high-vehicle-speed upper limit values, or a high-output running determining line defined by a series of high-output upper limit values.

Figure 9:
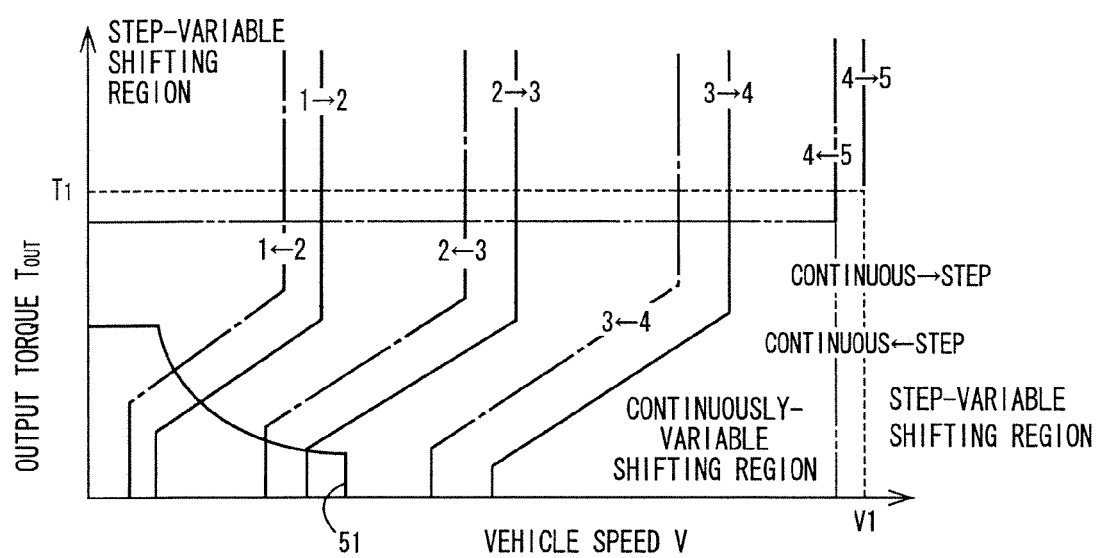
FIG. 9 is a view indicating a stored predetermined relationship used by the switching control means of FIG. 7, which is different from that of FIG. 8.

When the relationship shown in FIG. 9 is used, the above-indicated determination is made on the basis of the actual vehicle speed V and the drive-force-related value in the form of the output torque $T_{OUT}$. In FIG. 9, a broken line indicates a threshold vehicle speed V1 and a threshold output torque T1 which define a predetermined vehicle condition used for switching from the continuously-variable shifting control to the step-variable shifting control, and two-dot chain line indicates a predetermined vehicle condition used for switching from the step-variable shifting control to the continuously-variable shifting control. Thus, there is provided a hysteresis for determination as to whether the shifting state should be switched between the step-variable shifting region and the continuously-variable shifting region. In FIG. 9, a solid line 51 indicates a boundary line defining a motor drive region in which the vehicle is driven by a drive force generated by the electric motor, with a relatively low vehicle output torque or at a relatively low vehicle speed. FIG. 9 also shows a shift boundary data map which uses control parameters in the form of the vehicle speed V and the output torque $T_{OUT}$.

When the switching control means 60 determines that the vehicle condition is in the step-variable shifting region, the switching control means 60 disables a hybrid control means 62 to effect a hybrid control or continuously-variable shifting control, and enables a step-variable shifting control means 64 to effect a predetermined step-variable shifting control. Where the step-variable shifting control means 64 effects the step-variable shifting control according to the determination made on the basis of the relationship of FIG. 8, the step-variable shifting control means 64 effects an automatic shifting control according to a stored predetermined shift boundary data map. Where the determination is made on the basis of the relationship of FIG. 9, the automatic shifting control is effected according to the shift boundary data map shown in FIG. 9.

FIG. 2 indicates the combinations of the operating states of the hydraulically operated frictional coupling devices C0, C1, C2, B0, B1, B2 and B3, which are selectively engaged for effecting the step-variable shifting control. In this automatic step-variable shifting control mode, the first through fourth gear positions are established by an engaging action of the switching clutch C0, and the power distributing mechanism 16 functions as an auxiliary transmission having a fixed speed ratio of γ0 equal to "1". On the other hand, the fifth gear position is established by an engaging action of the switching brake B0 in place of the switching clutch C0, and the power distributing mechanism 16 functions as an auxiliary transmission having a fixed speed ratio γ0 equal to about 0.7, for example. That is, the drive system 10 as a whole including the power distributing mechanism 16 functioning as the auxiliary transmission and the automatic transmission portion 20 functions as a so-called "automatic transmission", in the automatic step-variable shifting control mode.

The drive-force-related value indicated above is a parameter corresponding to the drive force of the vehicle, which may be the output torque $T_{OUT}$ of the automatic transmission portion 20, the output torque $T_E$ of the engine 8, or the acceleration value of the vehicle, as well as the drive torque or drive force of drive wheels 38. The engine output torque $T_E$ may be an actual value calculated on the basis of the operating angle of the accelerator pedal or the opening angle of the throttle valve (or intake air quantity, air/fuel ratio or amount of fuel injection) and the engine speed $N_E$, or an estimated value of the required vehicle drive force which is calculated on the basis of the amount of operation of the accelerator pedal by the vehicle operator or the operating angle of the throttle valve. The vehicle drive torque may be calculated on the basis of not only the output torque $T_{OUT}$, etc., but also the ratio of a differential gear device and the radius of the drive wheels 38, or may be directly detected by a torque sensor or the like.

When the switching control means 60 determines that the vehicle condition is in the continuously-variable shifting region, on the other hand, the switching control means 60 commands the hydraulic control unit 42 to release both of the switching clutch C0 and the switching brake B0 for placing the power distributing mechanism 16 in the electrically established continuously-variable shifting state. At the same time, the switching control means 60 enables the hybrid control means 62 to effect the hybrid control, and commands the step-variable shifting control means 64 to select and hold a predetermined one of the gear positions, or to permit an automatic shifting control according to the stored predetermined shift boundary data map. In the latter case, the variable-step shifting control means 64 effects the automatic shifting control by suitably selecting the combinations of the operating states of the frictional coupling devices indicated in the table of FIG. 2, except the combinations including the engagement of the switching clutch C0 and brake B0. Thus, the power distributing mechanism 16 placed in the continuously-variable shifting state under the control of the switching control means 60 functions as the continuously variable transmission while the automatic transmission portion 20 connected in series to the power distributing mechanism 16 functions as the step-variable transmission, so that the drive system provides a sufficient vehicle drive force, such that the speed of the rotary motion transmitted to the automatic transmission portion 20 placed in one of the first, second, third and fourth gear positions, namely, the rotating speed of the power transmitting member 18 is continuously changed, so that the speed ratio of the drive system when the automatic transmission portion 20 is placed in one of those gear positions is continuously variable over a predetermined range. Accordingly, the speed ratio of the automatic transmission portion 20 is continuously variable through the adjacent gear positions, whereby the overall speed ratio γT of the drive system 10 as a whole is continuously variable.

The hybrid control means 62 controls the engine 8 to be operated with high efficiency, so as to establish an optimum proportion of the drive forces which are produced by the engine 8, and the first electric motor M1 and/or the second electric motor M2. For instance, the hybrid control means 62 calculates the output as required by the vehicle operator at the present running speed V of the vehicle, on the basis of the operating amount of the accelerator pedal and the vehicle running speed, and calculate a required vehicle drive force on the basis of the calculated required output and a required amount of generation of an electric energy to be stored. On the basis of the calculated required vehicle drive force, the hybrid control means 62 calculates a desired engine speed and a desired total output, and controls the actual output of the engine 8 and the amount of generation of the electric energy by the first electric motor M1, according to the calculated desired total output and engine speed $N_E$. The hybrid control means 62 is arranged to control the shifting action of the automatic transmission portion 20, while taking account of the presently selected gear position of the automatic transmission portion 20, so as to improve the fuel economy of the engine 8. In the hybrid control, the power distributing mechanism 16 is controlled to function as the electrically controlled continuously-variable transmission, for optimum coordination of the engine speed $N_E$ and vehicle speed V for efficient operation of the engine 8, and the rotating speed of the power transmitting member 18 determined by the selected gear position of the automatic transmission portion 20. That is, the hybrid control means 62 determines a target value of the overall speed ratio γT of the transmission mechanism 10 so that the engine 8 is operated according a stored highest-fuel-economy curve that satisfies both of the desired operating efficiency and the highest fuel economy of the engine 8. The hybrid control means 62 controls the speed ratio γ0 of the differential portion 11, so as to obtain the target value of the overall speed ratio γT, so that the overall speed ratio γT can be controlled within a predetermined range, for example, between 13 and 0.5.

The hybrid control means 62 controls an inverter 68 such that the electric energy generated by the first electric motor M1 is supplied to an electric-energy storage device 70 and the second electric motor M2 through the inverter 68. That is, a major portion of the drive force produced by the engine 8 is mechanically transmitted to the power transmitting member 18, while the remaining portion of the drive force is consumed by the first electric motor M1 to convert this portion into the electric energy, which is supplied from the first electric motor M1 to the second electric motor M2 through the inverter 68 and consumed by the second electric motor M2, or supplied from the first electric motor M1 to the electric-energy storage device 70 through the inverter 68 and subsequently consumed by the first electric motor M1. A drive force produced by an operation of the second electric motor M2 or first electric motor M1 with the electric energy generated by the first electric motor M1 is transmitted to the power transmitting member 18. Thus, the transmission mechanism 10 is provided with an electric path through which an electric energy generated by conversion of a portion of a drive force of the engine 8 is converted into a mechanical energy. This electric path includes components associated with the generation of the electric energy and the consumption of the generated electric energy by the second electric motor M2. The hybrid control means 62 can establish a motor-drive mode to drive the vehicle by utilizing the electric CVT function of the power distributing mechanism 16, irrespective of whether the engine 8 is in the non-operated state or in the idling state.

In the above-described arrangements of the switching control means 60, hybrid control means 62 and step-variable shifting control means 64, the power distributing mechanism 16 is placed in the continuously-variable shifting state, assuring a high degree of fuel economy of the vehicle, when the vehicle is in a low- or medium-speed running state or in a low- or medium-output running state, with the engine operated in the normal output state. When the vehicle is in a high-speed running state or at a high speed of operation of the engine 8, on the other hand, the power distributing mechanism 16 is placed in the fixed-speed-ratio shifting state in which the output of the engine 8 is transmitted to the drive wheels 38 primarily through the mechanical power transmitting path, so that the fuel economy is improved owing to reduction of a loss of conversion of the mechanical energy into the electric energy. When the engine 8 is in a high-output state, the power distributing mechanism 16 is placed in the fixed-speed-ratio shifting state. Thus, the power distributing mechanism 16 is placed in the continuously-variable shifting state, only when the vehicle speed or output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first and second electric motors M1, M2, and the required size of the drive system 10 including the electric motors.

Figure 10:
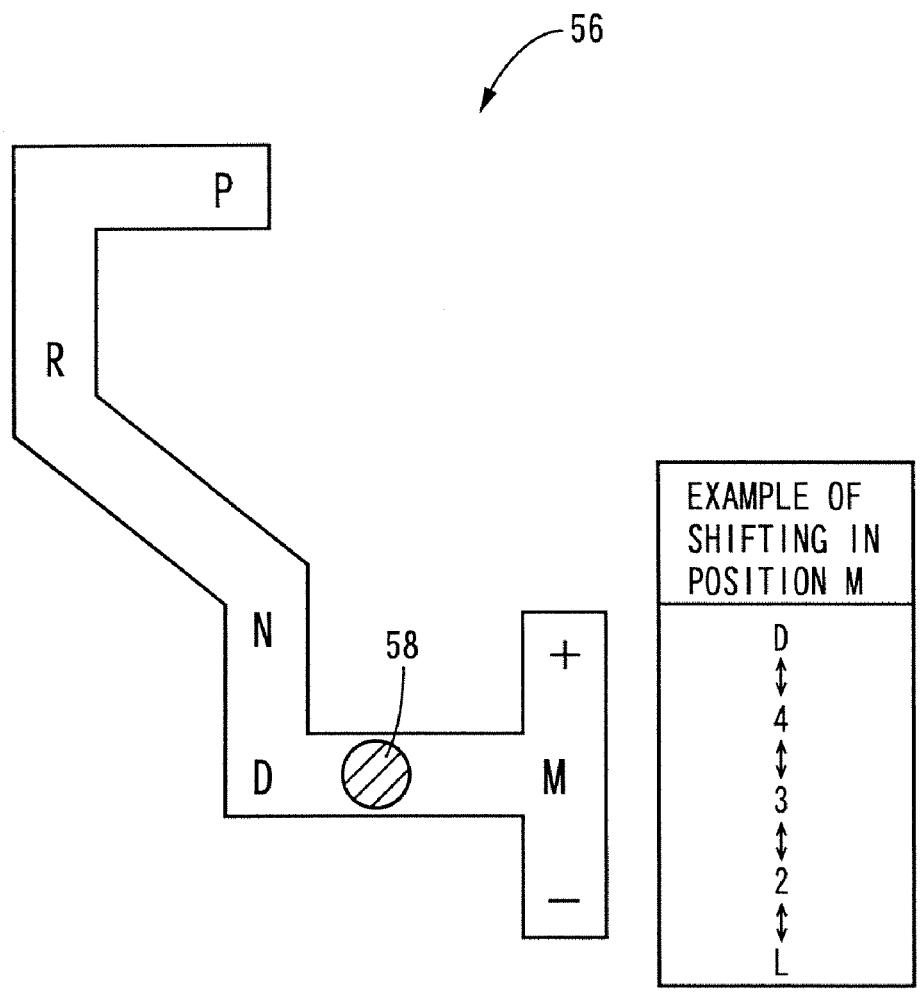
FIG. 10 is a view showing an example of a manually operated shifting device used to manually shift the vehicular drive system of FIG. 1.

FIG. 10 shows an example of a manually operable shifting device in the form of a shifting device 56. The shifting device 56 includes the above-described shift lever 58, which is disposed laterally adjacent to an operator's seat, for example, and which is manually operated to select one of a plurality of positions consisting of: a parking position P for placing the drive system 10 (namely, automatic transmission portion 20) in a neutral state in which a power transmitting path is disconnected with both of the switching clutch C0 and brake B0 placed in the released state, and at the same time the output rotary member 22 of the automatic transmission portion 20 is in the locked state; a reverse-drive position R for driving the vehicle in the rearward direction; a neutral position N for placing the drive system 10 in the neutral state; an automatic forward-drive shifting position D; and a manual forward-drive shifting position M. The parking position P and the neutral position N are non-driving positions selected when the vehicle is not driven, while the reverse-drive position R, and the automatic and manual forward-drive shifting positions D, M are driving positions selected when the vehicle is driven. The automatic forward-drive shifting position D provides a highest-speed position, and positions "4" through "L" selectable in the manual forward-drive shifting position M are engine-braking positions in which an engine brake is applied to the vehicle.

The manual forward-drive shifting position M is located at the same position as the automatic forward-drive shifting position D in the longitudinal direction of the vehicle, and is spaced from or adjacent to the automatic forward-drive shifting position D in the lateral direction of the vehicle. The shift lever 58 is operated to the manual forward-drive shifting position M, for manually selecting one of the positions "D" through "L". Described in detail, the shift lever 58 is movable from the manual forward-drive shifting position M to a shift-up position "+" and a shift-down position "−", which are spaced from each other in the longitudinal direction of the vehicle. Each time the shift lever 58 is moved to the shift-up position "+" or the shift-down position "−", the presently selected position is changed by one position. The five positions "D" through "L" have respective different lower limits of a range in which the overall speed ratio γT of the drive system 10 is automatically variable, that is, respective different lowest values of the overall speed ratio γT which corresponds to the highest output speed of the drive system 10. Namely, the five positions "D" through "L" select respective different numbers of the gear positions or speed positions of the automatic transmission portion 20 which are automatically selectable, so that the lowest overall speed ratio γT available is determined by the selected number of the selectable gear positions. The shift lever 58 is biased by biasing means such as a spring so that the shift lever 58 is automatically returned from the shift-up position "+" and shift-down position "−" back to the manual forward-drive shifting position M. The shifting device 46 is provided with shift-position sensors operable to detect the presently selected position of the shift lever 58, so that signals indicative of the presently selected operating position of the shift lever 58 and the number of shifting operations of the shift lever 58 in the manual forward-shifting position M are supplied to the electronic control device 50.

When the shift lever 56 is operated to the automatic forward-drive shifting position D, the switching control means 60 effects an automatic switching control of the drive system 10, and the hybrid control means 62 effects the continuously-variable shifting control of the power distributing mechanism 16, while the step-variable shifting control means 64 effects an automatic shifting control of the automatic transmission portion 20. When the drive system 10 is placed in the step-variable shifting state, for example, the shifting action of the drive system 10 is automatically controlled to select an appropriate one of the first-gear position through the fifth gear position indicated in FIG. 2. When the drive system 10 is placed in the continuously-variable shifting state, the speed ratio of the power distributing mechanism 16 is continuously changed, while the shifting action of the automatic transmission portion 20 is automatically controlled to select an appropriate one of the first-gear through fourth gear positions, so that the overall speed ratio γT of the drive system 10 is controlled so as to be continuously variable within the predetermined range. The automatic forward-drive position D is a position selected to establish an automatic shifting mode (automatic mode) in which the drive system 10 is automatically shifted.

When the shift lever 68 is operated to the manual forward-drive shifting position M, on the other hand, the shifting action of the drive system 10 is automatically controlled by the switching control means 60, hybrid control means 62 and step-variable shifting control means 54, such that the overall speed ratio γT is variable within a predetermined range the lower limit of which is determined by the gear position having the lowest speed ratio, which gear position is determined by the manually selected one of the positions "D" through "L". When the drive system 10 is placed in the step-variable shifting state, for example, the shifting action of the drive system 10 is automatically controlled within the above-indicated predetermined range of the overall speed ratio γT. When the drive system 10 is placed in the continuously-variable shifting state, the speed ratio of the power distributing mechanism 16 is continuously changed, while the shifting action of the automatic transmission portion 20 is automatically controlled to select an appropriate one of the gear positions the number of which is determined by the manually selected one of the positions "D" through "L", so that the overall speed ratio γT of the drive system 10 is controlled so as to be continuously variable within the predetermined range. The manual forward-drive position M is a position selected to establish a manual shifting mode (manual mode) in which the selectable gear positions of the drive system 10 are manually selected.

Figure 11:
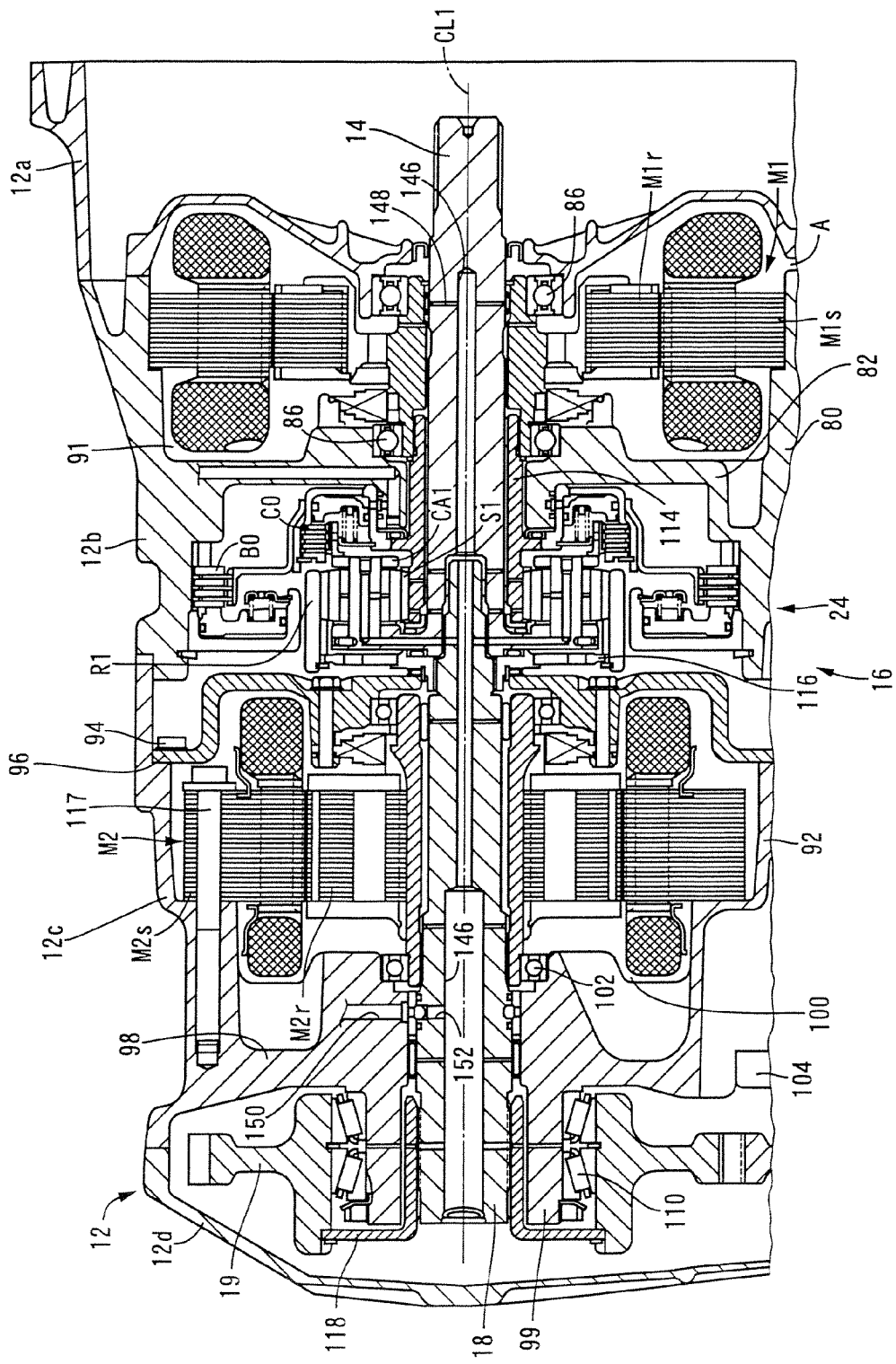
FIG. 11 is a fragmentary cross sectional view of a part of the drive system of FIG. 1 which includes a first planetary gear set and two electric motors.
Figure 12:
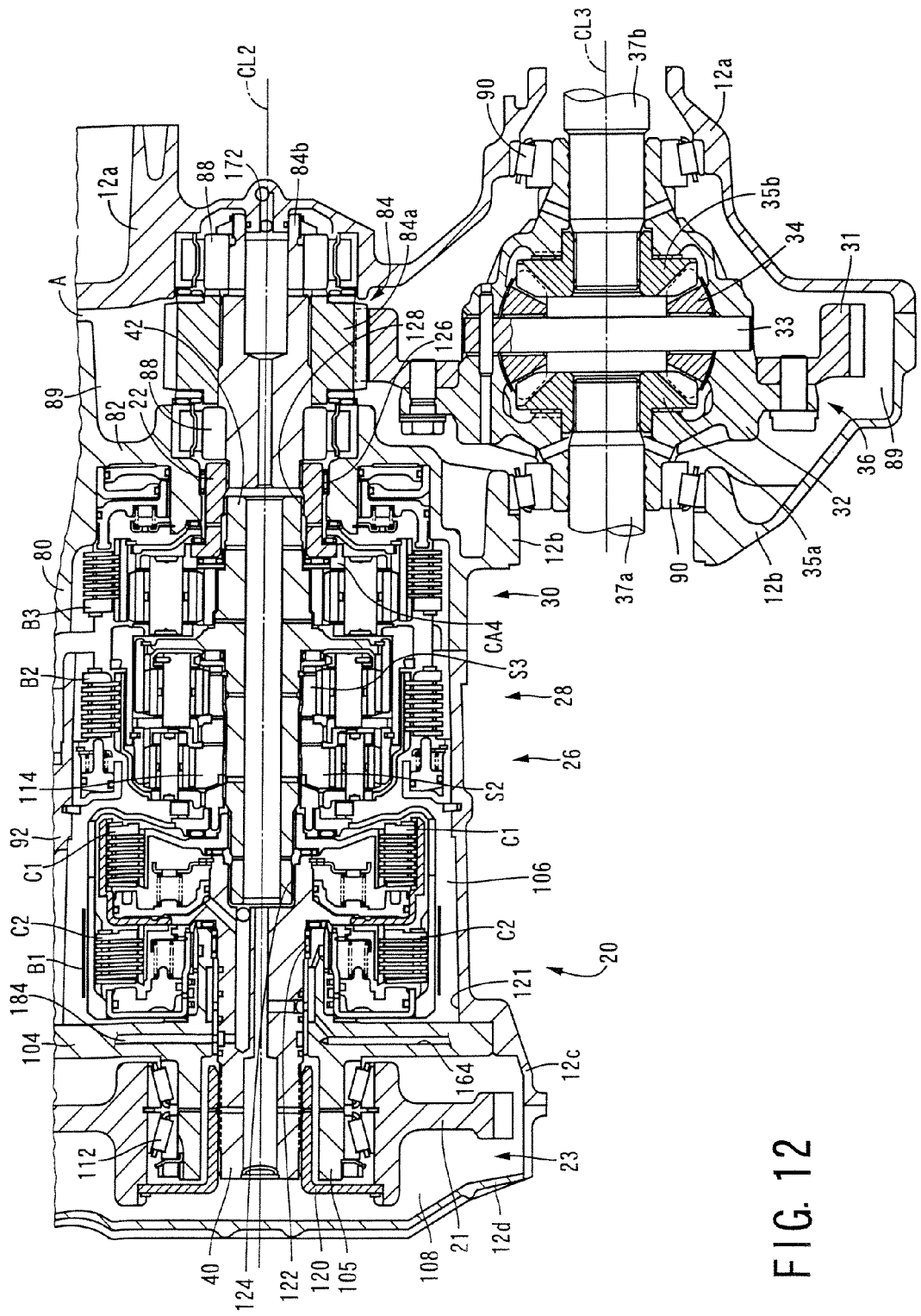
FIG. 12 is a fragmentary cross sectional view of another part of the drive system of FIG. 1 which includes second, third and fourth planetary gear set and a final reduction gear device.
Figure 13:
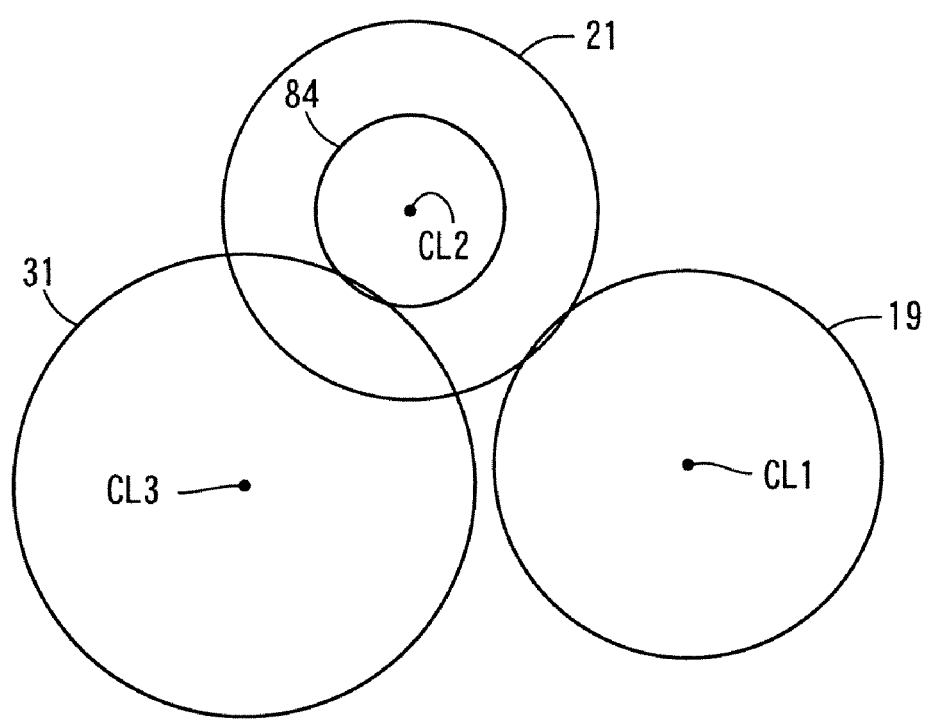
FIG. 13 is a transverse cross sectional view for explaining relative positions of first, second and third axes of the vehicular drive system of FIG. 1.

Referring to the cross sectional views of FIGS. 11 and 12, there are respectively shown a part of the vehicular drive system 10 which includes the first planetary gear set 24 and the two electric motors M1, M2, and another part of the vehicular drive system 10 which includes the second, third and fourth planetary gear sets 26, 28, 30 and the final reduction gear device 36. In the vehicular drive system 10, the first, second and third axes CL1, CL2, CL3 are positioned relative to each other, as shown in FIG. 13. The cross sectional view of FIG. 11 is taken in a plane including the first axis CL1, while the cross sectional view of FIG. 12 is taken in a plane including the second and third axes CL2, CL3. The horizontal direction as seen in FIG. 13 is the longitudinal or running direction of the vehicle, and the vertical direction as seen the same figure is the vertical direction of the vehicle, while the direction perpendicular to the plane of FIG. 13 (namely, the direction parallel to the axes CL1-CL3) is the transverse or width direction of the vehicle. The first and third axes CL1, CL3 are spaced apart from each other in the longitudinal direction of the vehicle by a distance determined to prevent an interference between the drive gear 19 and the large-diameter gear 31, and have substantially the same vertical positions. The second axis CL2 is located intermediate between the first and third axes CL1, CL3 in the longitudinal direction, and has a higher vertical position than the first and third axes CL1, CL3.

As shown in FIGS. 11 and 12, the housing 12 consists of four separate parts in the form of a cap-shaped first casing portion 12a, a cylindrical second casing portion 12b, a cylindrical third casing portion 12c and a cap-shaped fourth casing portion 12d, which are arranged in the axial direction parallel to the axes CL1-CL3 and which are fastened together by bolts (not shown) into a fluid-tight housing structure. The first, second, third and fourth casing portions 12a, 12b, 12c, 12d are light-alloy castings, for instance, formed of aluminum by die casting.

The first casing portion 12a is also bolted to the engine 8, and fixed to the second casing portion 12b, so as to close one of opposite axial openings which is on the side of the engine 8. The second casing portion 12b includes an integral partition wall 80 which divides its interior space into a space on the side of the first axis CL1, and a space on the side of the second axis CL2. The second casing portion 12b further includes an integral partition wall 82 which divides its interior space into a space on the side of the engine 8, and a space remote from the engine 8. In the space defined by the first casing portion 12a and the partition wall 82 of the second casing portion 12b, there are accommodated the first electric motor M1 coaxially with the first axis CL1, a differential drive gear 84 coaxially with the second axis CL2, and the final reduction gear device 36 coaxially with the third axis CL3. The rotor M1r of the first electric motor M1 is rotatably supported by the first casing portion 12a and the partition wall 82 of the second casing portion 12b, via a pair of bearings 86, and the differential drive gear 84 is rotatably supported by the first casing portion 12a and the partition wall 82, via a pair of bearings 88, while the differential casing 32 of the final reduction gear device 36 is rotatably supported by the first and second casing portions 12a, 12b, via a pair of bearings 90. The differential drive gear 84 consists of an annular outer gear portion 84a meshing with the large-diameter gear 31, and a shaft portion 84b which is splined to the inner circumferential surface of the outer gear portion 84a and which supports the outer gear portion 84a. The large-diameter gear 31 and the outer gear portion 84a are both helical gears.

The partition wall 80 of the second casing portion 12b has an axial extension protruding toward the first casing portion 12a, and divides the interior space between the first and second casing portions 12a, 12b, into a fifth accommodating chamber 89 accommodating the differential drive gear 84, and a first accommodating chamber 91 accommodating the first electric motor M1. The free or distal end of the extension of the partition wall 80 and the first casing portion 12a cooperate to define a gap A which permits a flow of a lubricant from the fifth accommodating chamber 89 to the first accommodating chamber 91. The gap A may be considered to function as a hole formed through the partition wall 80, for communication between the fifth accommodating chamber 89 and the first accommodating chamber 91.

The power distributing mechanism 16 is accommodated coaxially with the first axis CL1, in one of the four spaces provided in the second casing portion 12b and defined by the two partition walls 80, 82, which one space is on the side of the first axis CL1 and on the side remote from the engine 8.

The third casing portion 12c includes an integral partition wall 92 located adjacent to the partition wall 80 in the axial direction, and an integral support wall 98, and is provided with a separate support wall 96 removably fixed thereto by bolts 94. The partition wall 92 and the support walls 96, 98 cooperate to define a space in the form of a second accommodating chamber 100 in which the second electric motor M2 is accommodated coaxially with the first axis CL1. The support wall 96 defines one of opposite axial ends of the second accommodating chamber 100 which is on the side of the engine 8, while the support wall 98 defines the other axial end of the second accommodating chamber 100 which is remote from the engine 8. The rotor M2r of the second electric motor M2 is rotatably supported by the support walls 96, 98, via a pair of bearings 102.

The third casing portion 12c is further provided with a separate support member 104 in the form of a circular disk fitted therein and bolted thereto, so as to define one of opposite axial ends of the space provided in the third casing portion 12c and located on the side of the second axis CL2, which one axial end is remote from the engine 8. This support member 104 functions as a support member for rotatably supporting the first intermediate shaft 40 and the second intermediate shaft 42, and is fixed removably to the third casing portion 12c by bolts (not shown). The support member 104 of the third casing portion 12c and the support wall 82 of the second casing portion 12b cooperate to define opposite axial ends of a third accommodating chamber 106 in which the automatic transmission portion 20 is accommodated coaxially with the second axis CL2.

The support wall 98 and support member 104 of the third casing portion 12c cooperate with the fourth casing portion 12d to define a fourth accommodating chamber 108 in which the drive linkage 23 consisting of the mutually meshing drive and driven gears 19, 21 is accommodated. The support wall 98 includes a cylindrical projection 99 extending in the axial direction away from the second electric motor M2, that is, toward the fourth casing portion 12d, while the support member 104 includes a cylindrical projection 105 extending in the same axial direction. The drive gear 19 is rotatably supported by the cylindrical projection 99 via bearings 110, while the driven gear 21 is rotatably supported by the cylindrical projection 105 via bearings 112.

The input rotary member 14 and the power transmitting member 18 disposed on the first axis CL1 have axial end portions coupled together such that the axial end portion of the power transmitting member 18 is fitted in a hole formed in the axial end portion of the input rotary member 14, such that the input rotary member 14 and the power transmitting member 18 are rotatable relative to each other. The input rotary member 14 is rotatably supported at an intermediate axial portion thereof by the first casing portion 12a, and at its above-indicated axial end portion by the above-indicated axial end portion of the power transmitting member 18, indirectly via needle bearings. The power transmitting member 18 is rotatably supported indirectly by the support wall 96 via a needle bearing, and directly by the support wall 98. In the present embodiment, the input rotary member 14 and the power transmitting member 18 respectively function as the first and second input shafts. On the first input shaft 14, there are coaxially disposed the first electric motor M1, hydraulically operated frictional coupling devices in the form of the switching clutch C0 and brake B0, and power distributing mechanism 16. On the second input shaft 18, there is coaxially disposed the second electric motor M2.

The stator M1s of the first electric motor M1 is fitted in the second casing portion 12b, in contact with the inner circumferential surface of the second casing portion 12b, and the rotor M1r is splined to a tubular sun gear shaft 114 which has the first sun gear S1 formed at one axial end portion and which extends through the support wall 82. Accordingly, the rotor M1r and the first sun gear S1 are rotated together. The sun gear shaft 114 is rotatably supported by the outer circumferential surface of the input rotary member 14. The axial end portion of the input rotary member 14 which is remote from the engine 8 is integrally fixed to the first carrier CA1, so that the first carrier CA1 is rotated together with the input rotary member 14. Accordingly, the input rotary member 14 also functions as an input shaft of the first planetary gear set 24 or the power distributing mechanism 16.

A support member 116 in the form of a circular disc is provided to support the cylindrical first ring gear R1 of the first planetary gear set 24, such that the support member 116 is splined to the inner circumferential surface of the first ring gear R1 and to the outer circumferential surface of an axial end portion of the power transmitting member 18, so that the first ring gear R1 and the power transmitting member 18 are rotated as a unit. The switching clutch C0 is disposed between the support wall 82 and the first planetary gear set 24, to selectively connect the first carrier CA1 and the sun gear shaft 114, while the switching brake B0 is disposed radially outwardly of the first planetary gear set 24, more precisely, between the first planetary gear set 24 and the inner surface of the second casing portion 12b, to selectively fix the sun gear shaft 114 to the second casing portion 12b.

The stator M2s of the second electric motor M2 is fixed to the inner surface of the third casing portion 12c by bolts 117, while the rotor M2r of the second electric motor M2 is rotatably supported by the support wall 96 and the support wall 98 via a pair of bearings 102. The tubular power transmitting member 18 has stepped axial portions having different diameters which decrease in the axial direction from the support wall 98 toward the engine 8. The power transmitting member 18 extends through the rotor M2r of the second electric motor M2, and is splined to the inner circumferential surface of the rotor M2r, so that the power transmitting member 18 and the rotor M2r are rotated as a unit. Accordingly, the power transmitting member 18 can be inserted through the second electric motor M2, first planetary gear set 24 and first electric motor M1, after the third casing portion 12c in which the second electric motor M2 is fixed in place is assembled with respect to the second casing portion 12b in which the first electric motor M1 and the first planetary gear set 24 are positioned in place. A cylindrical connecting member 118 fixed to the inner circumferential surface of the drive gear 19 is splined to the outer circumferential surface of the axial end portion of the power transmitting member which is remote from the engine 8, so that the drive gear 19 is fitted on the above-described axial end portion of the power transmitting member 18 via the connecting member 118, such that the drive gear 19 and the power transmitting member 18 are rotated as a unit.

The first intermediate shaft 40, second intermediate shaft 42, output rotary member 22 and differential drive gear 84 are arranged coaxially with the second axis CL2, in the axial direction in the order of description from the driven gear 21 toward the side of the engine 8. A cylindrical connecting member 120 fixed to the inner circumferential surface of the driven gear 21 is splined to the axial end portion of the first intermediate shaft 40 which is remote from the second intermediate shaft 42. The third accommodating chamber 106 formed in the second and third casing portions 12b, 12c and between the support member 104 and the support wall 82 to accommodate the automatic transmission portion 20 has stepped axial portions the inner circumferential surfaces of which have different diameters decreasing in the axial direction from the support wall 82 toward the driven gear 21. Accordingly, the automatic transmission portion 20 can be installed into the third accommodating chamber 106 through an opening 121 of the chamber 106, in the absence of the support member 104. The support member 104 is fitted in a shoulder part of the third casing portion 12c, with high degrees of accuracy of positioning in the axial and radial directions, and is removably fixed to the third casing portion 12c by bolts (not shown).

The third accommodating chamber 106 accommodating the automatic transmission portion 20 is not provided with any support wall, so that the axial dimension of the third accommodating chamber 106 is minimized. Described more specifically, the first intermediate shaft 40 is rotatably supported by the support member 104 via a needle bearing 122, and the axial end portion of the comparatively long second intermediate shaft 42 which is on the side of the first intermediate shaft 40 is fitted in a hole formed in the adjacent axial end portion of the first intermediate shaft 40 and is rotatably supported by the first intermediate shaft 40 via a bushing 124, while the axial end portion of the second intermediate shaft 42 which is on the side of the differential drive gear 84 is fitted in the tubular output rotary member 22 rotatably supported by the support wall 82 via a needle bearing 126, and is rotatably supported by the output rotary member 22 via a bushing 128. Thus, the first intermediate shaft 40 and the output rotary member 22 which respectively function as the input and output shafts of the automatic transmission portion 20 are rotatably supported by the support member 104 and the support wall 82, while the second intermediate shaft 42 which is disposed between the first intermediate shaft 40 and output rotary member 22 and which functions as an intermediate shaft of the automatic transmission portion 20 is rotatably supported at its opposite axial end portions by the first intermediate shaft 40 and the output rotary member 22, without any intermediate support wall supporting the second intermediate shaft 42 which supports the second, third and fourth planetary gear sets 26, 28, 30. Accordingly, the required axial dimension of the automatic transmission portion 20 can be reduced.

The sun gear shaft 114 is rotatably supported by the second intermediate shaft 42, and the first clutch C1 is disposed between the first and second intermediate shafts 40, 42, while the second clutch C2 is disposed between the first intermediate shaft 40 and the sun gear shaft 114. The second and third sun gears S2, S3 are formed integrally with the sun gear shaft 114. The output rotary member 22 is connected to the fourth carrier CA4, and is splined to the shaft portion 84b of the differential drive gear 84. The second and third brakes B2, B3 have friction plates and pistons having an outside diameter smaller than the inside diameter of the opening 121 of the third accommodating chamber 106, so that the second and third brakes B2, B3 can be installed in the third accommodating chamber 106, through the opening 121 in the absence of the support member 104. Similarly, a sub-assembly of the first and second clutches C1, C2 mounted on the outer circumferential surface of the first intermediate shaft 40, and a sub-assembly of the second, third and fourth planetary gear sets 26, 28, 30 mounted on the outer circumferential surface of the second intermediate shaft 42 have outside diameters smaller than the inside diameter of the opening 121, so that those sub-assemblies can be installed in place in the third accommodating chamber 106, through the opening 121 in the absence of the support member 104.

Figure 14:
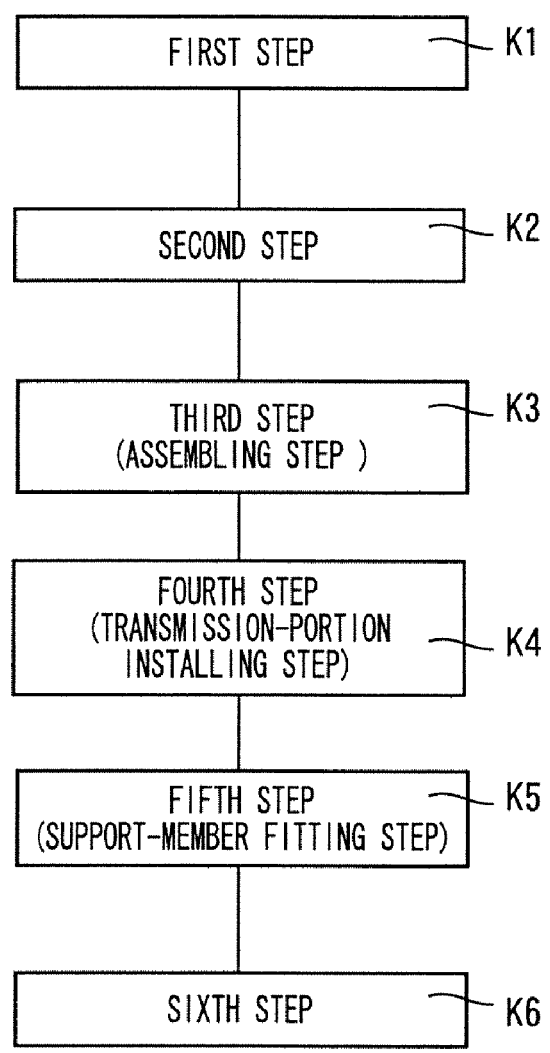
FIG. 14 is a flow chart illustrating a process of assembling the vehicular drive system of FIG. 1.

The vehicular drive system 10 constructed as described above is assembled as indicated in the flow chart of FIG. 14. In a first step K1, the first casing portion 12a and the second casing portion 12b are assembled together, and the first electric motor M1, differential drive gear 84 and final reduction gear device 36 are accommodated in the space between the first casing portion 12a and the second casing portion 12b, such that the first electric motor M1 is coaxial with the first axis CL1, while the differential drive ear 84 and final reduction gear device 36 are coaxial with the respective second and third axes CL2, CL3. The differential drive gear 84 is installed independently of and prior to the installation of the automatic transmission portion 20.

In a second step K2, the input rotary member 14 is inserted to extend through the first electric motor M1 installed in the space between the first and second casing portions 12a, 12b, and the switching clutch C0, switching brake B0 and a subassembly of the first planetary gear set 24 are installed in a portion of the space within the second casing portion 12b, into which portion the axial end portion of the input rotary member 14 remote from the engine 8 extends. It is noted that the first and second steps K1 and K2 may be implemented after fourth and fifth steps K4, K5 described below. In a third step K3 (assembling step), the second casing portion 12b (first separate casing), and the third casing portion 12c (second separate casing) in which the second electric motor M2 has been installed are assembled together, and the power transmitting member 18 is inserted into the second electric motor M2 and the first planetary gear set 24.

In a fourth step K4 (transmission-portion installing step), the piston and friction plates of the third brake B3, and the piston and friction plates of the second brake B2 are installed in the third accommodating chamber 106, through the opening 121 of the third casing portion 12c, such that the third brake B3 is located on one of opposite axial sides of the second brake B2 which is remote from the opening 121. Then, the sub-assembly of the second, third and fourth planetary gear sets 26, 28, 30 mounted on the second intermediate shaft 42 is installed in the third accommodating chamber 106, and the first clutch C1, second clutch C2 and first intermediate shaft 40 are inserted in the third accommodating chamber 106. In this fourth step K4, the output rotary member 22 of the automatic transmission portion 20 which is connected to the fourth carrier CA4 of the fourth planetary gear set 30 is splined to the shaft portion 84b of the differential drive gear 84 supported by the first and second casing portions 12a, 12b already assembled together, so that the output rotary member 22 and the differential drive gear 84 are rotated as a unit. In a fifth step K5 (support-member fitting step), the support member 104 is fitted in the third casing portion 12c, and fixed therein by bolts (not shown).

In a sixth step K6, the drive gear 19 and driven gear 21 are respectively mounted on the support wall 98 and support member 104, via the bearings 110, 112, respectively, such that the drive gear 19 is connected by the connecting member 118 to the axial end portion of the power transmitting member 18, while the driven gear 21 is connected by the connecting member 120 to the axial end portion of the first intermediate shaft 40, and the fourth casing portion 12d is fixed to the third casing portion 12c, so as to cover the drive gear 19 and driven gear 21.

In the present vehicular drive system 10, the support wall 82 of the second casing portion 12b has oil passages through which a pressurized working oil is supplied from a shift control valve (not shown) to the hydraulically operated differential limiting device in the form of the switching clutch C0 and switching brake B0, and to the frictional coupling devices in the form of the brakes B2, B3, etc. of the automatic transmission portion 20. Those oil passages include a clutch engaging oil passage 134 for supplying the working oil to an oil chamber 132 for advancing a piston 130 of the switching clutch C0, as shown in enlargement in FIG. 15. The oil passages further include a brake engaging oil passage 140 for supplying the working oil to an oil chamber 138 for advancing first and second pistons 136a, 136b of the brake B3, as shown in enlargement in FIG. 16. In the oil chamber 138, the first and second pistons 136a, 136b are movable in abutting contact with each other. A stationary partition wall 142 is provided to divide a space between the first and second pistons 136a, 136b, into two parts, so that a hydraulic pressure acts on the back surface of the first piston 136a while an atmospheric pressure acts on the front surface of the second piston 136b. Accordingly, the pistons 136a, 136b are advanced by a large force based on a pressure-receiving surface which is two times the cross sectional surface area of the oil chamber 138.

Figure 15:
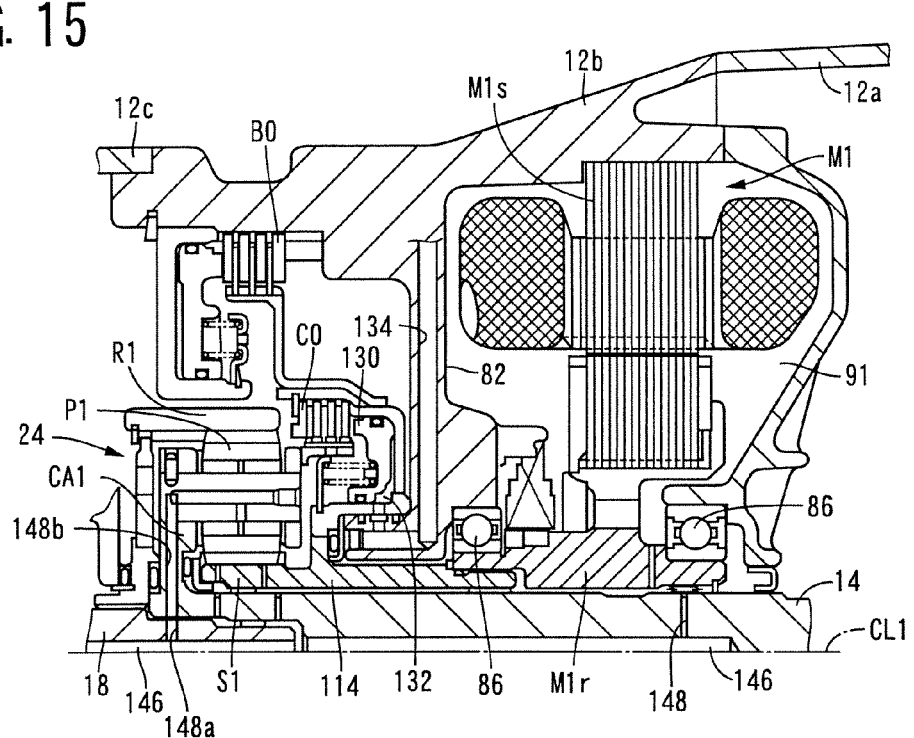
FIG. 15 is a fragmentary enlarged view in cross section showing the first electric motor, the first planetary gear set, and other components adjacent to the first electric motor and the first planetary gear set.
Figure 17:
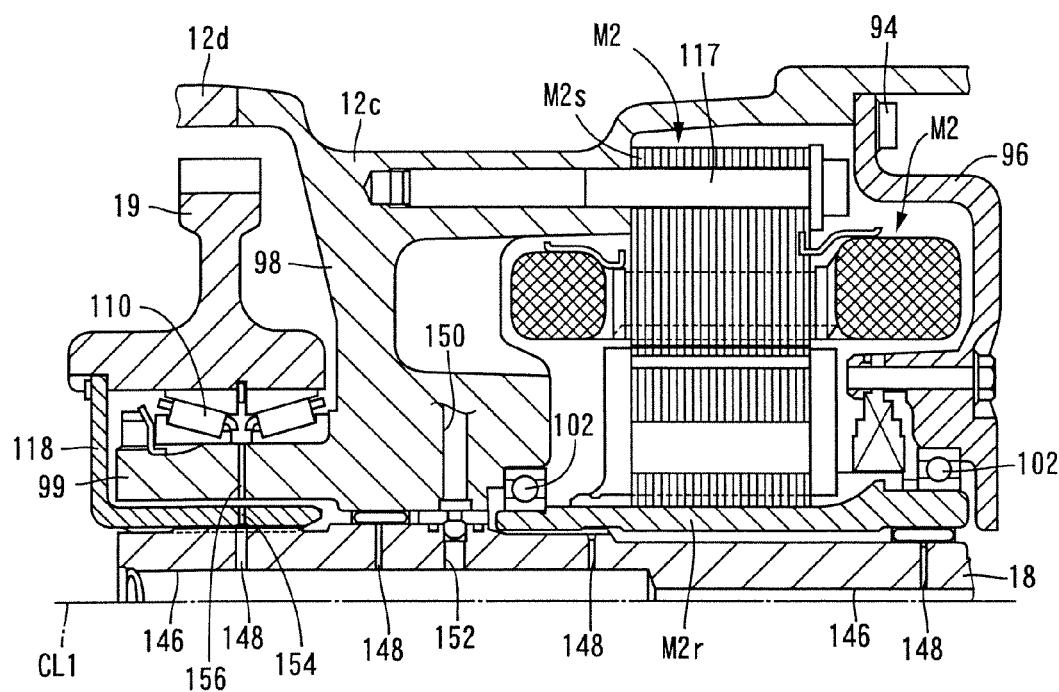
FIG. 17 is a fragmentary enlarged view in cross section showing the second electric motor, a drive gear, and components adjacent to the second electric motor and the drive gear.

The support wall 98 of the third casing portion 12c and the support member 104 fitted in the third casing portion 12c have oil passages for supplying a lubricant to the bearing portions and meshing portions of the various rotary members of the vehicular drive system 10. For example, the input rotary member 14 and the power transmitting member 18 coaxial with the first axis CL1 have an axial oil passage 146 formed to extend in parallel with the first axis CL1, and a plurality of radial oil passages 148 formed to extend in the radial directions, as shown in FIGS. 11, 15 and 17, for introducing the lubricant to predetermined lubricating points. The support wall 98 of the third casing portion 12c has a lubricant passage 150 which receives a lubricant delivered from a regulator valve (not shown), and the power transmitting member 18 has a lubricant inlet passage 152 formed in its radial direction in communication with the lubricant passage 150, at an axial position thereof opposed to the open end of the lubricant passage 150. The lubricant passage 150 and the lubricant inlet passage 152 are located between the bearing 110 of the drive gear 19, and one of the two bearings 115 of the rotor M2r of the second electric motor M2, which is located on one side of the rotor M2r remote from the engine 8.

The lubricant introduced through the lubricant passage 150 and lubricant inlet passage 152 is delivered through the axial passage 146 formed through the second input shaft in the form of the power transmitting member 18, in the opposite axial directions, to the first planetary gear set 24 and to the drive gear 19, so that the bearings 86, the carrier CA1 of the first planetary gear set 24, the bearings 110, and the needle bearings are lubricated by the lubricant delivered through the radial oil passages 148 communicating with the axial passage 146. To the bearings 110 supporting the drive gear 19, the lubricant is supplied through not only the radial passages 148, but also radial oil passages 154 formed through the connecting member 118 so as to extend in the radial directions, and radial oil passages 156 formed through the cylindrical projection 99 so as to extend in the radial directions.

The first planetary gear set 24 constituting a part of the differential mechanism is supported by the axial end portion of the power transmitting member 18 and the axial end portion of the input rotary member 14 which is fitted on the above-indicated axial end portion of the power transmitting member 18 such that the power transmitting member 18 and the input rotary member 14 are rotatable relative to each other. These axial end portions of the power transmitting member 18 and input rotary member 14 have respective radial passages 148a, 148b formed to extend in the radial direction, as shown in FIG. 15, so that the lubricant supplied from the axial oil passage 146 is delivered through the radial passages 148a, 148b to the first planetary gear set 24, in particular, to a portion between the carrier CA1 and pinion P1 on which a relatively large load acts.

Figure 16:
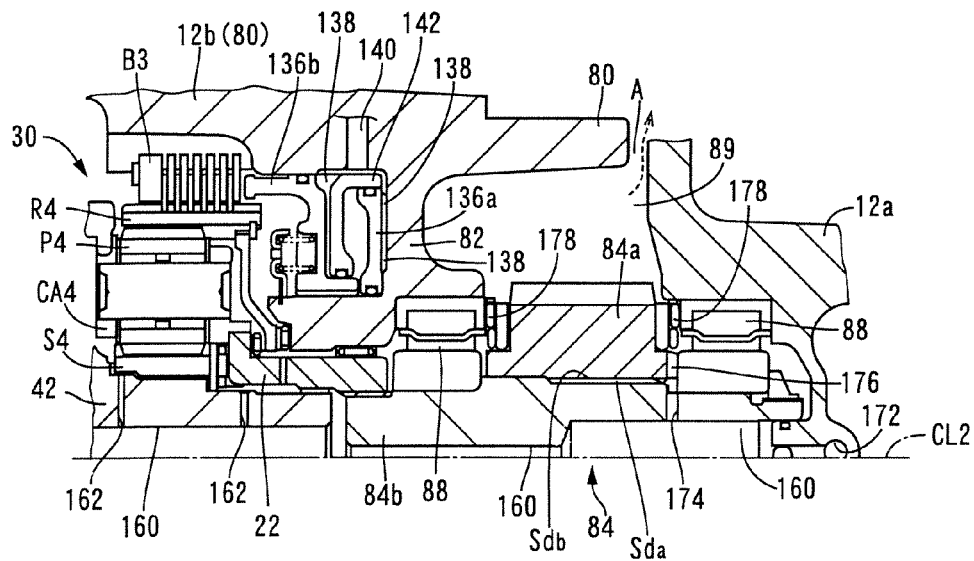
FIG. 16 is a fragmentary enlarged view in cross section showing a differential drive gear, and components adjacent to the differential drive gear.
Figure 18:
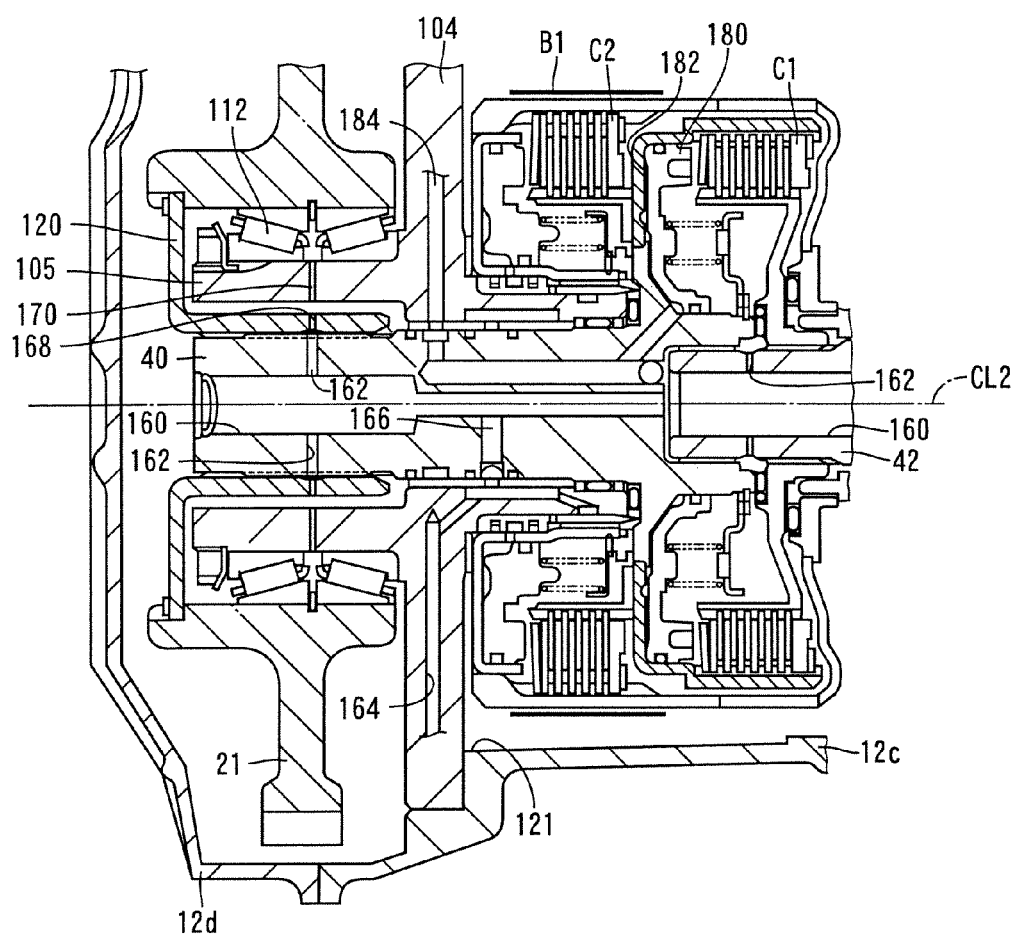
FIG. 18 is a fragmentary enlarged view in cross section of the driven gear, clutches C1 and C2 of an automatic transmission shown in FIG. 12, and components adjacent to the driven gear and the clutches.

The first intermediate shaft 40, second intermediate shaft 42, and shaft portion 84b of the differential drive gear 84 have an axial oil passage 160 formed to extend in parallel with the second axis CL2, and a plurality of radial oil passages 162 formed to extend in the radial directions, as shown in FIGS. 12, 16 and 18, for introducing the working fluid to predetermined lubricating points. The support member 104 has a lubricant passage 164 through which the working oil delivered from a regulator valve (not shown) is supplied as the lubricant. The first intermediate shaft 40 has a plurality of radial lubricant inlet passages 166 in communication with the lubricant passage 164, at an axial position thereof opposed to the open end of the lubricant passage 164. Accordingly, the pressurized working oil supplied to the axial passage 160 through the lubricant passage 164 and lubricant inlet passages 166 is delivered through the radial oil passages 162 to the bearings 112, second, third and fourth planetary gear sets 26, 28, 30 of the automatic transmission portion 20, frictional coupling devices C1, C2, B1, B2, B3 of the automatic transmission portion 20, bearings 88 and the bushings. To the bearings 112 supporting the driven gear 21, the lubricant is supplied through the radial oil passages 162, radial oil passages 168 formed through the connecting member 120 so as to extend in the radial directions, and radial oil passages 170 formed through the cylindrical projection 105 so as to extend in the radial directions.

As described above, the working oil is supplied from the lubricant passage 164 of the support member 104 to the axial passage 160 formed through the first and second intermediate shafts 40, 42, through the lubricant inlet passages 166 formed at an axially intermediate position of the first intermediate shaft 40. Accordingly, the working oil is delivered in the opposite axial directions to the driven gear 21 and to the automatic transmission portion 20, and the distances to the radial oil passages 162 provided at the lubricating points of the automatic transmission 20 are reduced, and the required cross sectional surface area of the axial passages 160 can be reduced.

The first casing portion 12a also has a lubricant passage 172 for supplying the working oil to the axial passage 160, so that the working oil is supplied through the lubricant passage 172 to a portion of the axial passage 160 within the shaft portion 84b of the differential drive gear 84, for lubricating the pair of bearings 88. The lubricant is delivered through the axial passage 160 to the teeth of the outer gear portion 84a of the differential drive gear 84 and to one of the two bearings 88 on the side of the driven gear 21, through a gap between the shaft portion 84b and the second intermediate shaft 42, and a gap between the output rotary member 22 and the shaft portion 84b which are splined to each other. The lubricant is also delivered through the axial passage 160 to the other bearing 88 on the side of the engine 8 and the teeth of the outer gear portion 84a, through a radial oil passage 174 formed through the shaft portion 84b at an axial position thereof corresponding to that bearing 88, and a radial groove 176 formed in the end face of the outer gear portion 84a. Thus, the axial passage 160 is supplied with a sufficient amount of lubricant through the lubricant passage 172, radial passage 174 and radial groove 176, as well as through the lubricant passage 164 formed through the support member 104.

The inner circumferential surface of the outer gear portion 84a of the differential drive gear 84 has a splined axial portion Sda on the side remote from the automatic transmission portion 20. This splined axial portion Sda is splined to a splined axial portion Sdb of the outer circumferential surface of the shaft portion 84b, which is on the side remote from the automatic transmission portion 20. The other axial portion of the inner circumferential surface of the outer gear portion 84a which is on the side of the automatic transmission portion 20 is snugly fitted on the other axial portion of the outer circumferential surface of the shaft portion 84*b* which is on the side of the automatic transmission portion 20. Between the outer gear portion 84*a* and the pair of bearings 88, there are interposed a pair of thrust bearings 178, at predetermined axial positions, for receiving axial loads acting on the differential drive gear 84.

In the present vehicular drive system 10, the input-side hydraulically operated frictional coupling devices in the form of the clutches C1 and C2 are supplied with the working fluid through oil passages formed through the support member 104 fitted in the third casing portion 12*c*. Those oil passages include a clutch engaging oil passage 184 for supplying the working oil to an oil chamber 182 for advancing a piston 180 of the clutch C1, as shown in enlargement in FIG. 18.

In the drive system 10 constructed according to the present embodiment of the invention, the first electric motor M1, power distributing mechanism (differential portion) 16 and second electric motor M2 are disposed on the first axis CL1 while the automatic transmission portion (transmission portion) 20 is disposed on the second axis CL2 parallel to the first axis CL1. The power transmitting member (rotary member) 18 located at the end portion of the first axis CL1 remote from the input rotary member 14 and the rotary member at the end portion of the second axis CL2 remote from the input rotary member 14 are connected to each other through the drive linkage 23, so that the axial dimension of the first electric motor M1, power distributing mechanism (differential portion) 16 and second electric motor M2 disposed on the first axis CL1 and the axial dimension of the automatic transmission portion (transmission portion) 20 disposed on the second axis CL2 can be made substantially equal to each other, whereby the axial dimension of the drive system can be desirably reduced. Further, the housing of the vehicular drive system consists of the mutually separate first, second, third and fourth casing portions 12*a*, 12*b*, 12*c*, 12*d*, so that the drive system 10 can be easily assembled.

The drive system 10 of the present embodiment is further arranged such that the rotor M1*r* of the first electric motor M1 which has a comparatively large dimension in the direction of the first axis CL1 is rotatably supported by the first casing portion 12*a* and the second casing portion 12*b*, that is, rotatably supported at two parts thereof, so that the vehicular drive system 10 can be assembled with higher efficiency.

The drive system 10 of the present embodiment is further arranged such that the rotor M2*r* of the second electric motor M2 which has a comparatively large dimension in the direction of the first axis CL1 is rotatably supported by the third casing portion 12*c*, so that the second electric motor M2 is accommodated in the third casing portion 12*c*, whereby the vehicular drive system 10 can be assembled with higher efficiency.

The drive system 10 of the present embodiment is characterized by comprising (a) the hydraulically operated differential limiting device (switching clutch C0 and/or switching brake B0) provided in the power distributing mechanism (differential portion) 16, for selectively switching the power distributing mechanism 16 between the differential state and the non-differential state, and in that (b) the working oil is supplied to the hydraulically operated differential limiting device through the oil passage 134 formed through the support wall 82 of the second casing portion 12*b*. In this arrangement, the axial dimension of the vehicular drive system 10 can be made shorter than in the arrangement wherein additional member is provided for the sole purpose of forming the oil passage 134.

The drive system 10 of the present embodiment is characterized in that (a) the automatic transmission (transmission portion 20) is placed in a selected one of operating positions by a selected combination of engaged and released states of the plurality of hydraulically operated frictional coupling devices C1, C2, B1, B2, B3, and in that (b) the working oil is supplied to the hydraulically operated frictional coupling devices through the oil passage formed through the support wall 82 of the second casing portion 12*b*. In this arrangement, the axial dimension of the vehicular drive system 10 can be made shorter than in the arrangement wherein an additional member is provided for the sole purpose of forming the oil passage The drive system 10 of the present embodiment is further arranged such that the third casing portion 12*c* includes the radially inwardly extending support wall 96, 98 which rotatably supports the rotor M2*r* of the second electric motor M2, so that the rotor M2*r* of the second electric motor M2 can be rotatably supported at its two axial portions, whereby the vehicular drive system 10 can be assembled with higher efficiency.

The drive system 10 of the present embodiment is characterized in that (a) the drive linkage 23 consists of the drive gear 19 disposed on the first axis CL1 and the driven gear 21 which is disposed on the second axis CL2 and driven by the drive gear 19, and in that (b) the drive gear 19 is rotatably supported by the support wall 98 radially inwardly extending from the third casing portion 12*c*, while the driven gear 21 is rotatably supported by the support member 104 fitted in the third casing portion 12*c*. Accordingly, the drive gear 19 and the driven gear 21 are rotatably supported respectively by the third casing portion 12*c* and the support member 104 fitted in the third casing portion 12*c*. Like the automatic transmission portion (transmission portion) 20, the third support member 104 can be inserted into the third casing portion 12*c* and thereby fitted into the third casing portion 12*c*, through the rear opening of the third casing portion 12*c*, whereby the drive system 10 can be easily assembled.

The drive system 10 of the present embodiment is further arranged such that the differential portion cooperates with the first electric motor M1 and the second electric motor M2 to constitute the electrically controlled continuously variable transmission portion the speed ratio of which is continuously variable. Accordingly, the vehicle can be run with the drive system 10 placed in its step-variable or continuously-variable shifting state. The drive system 10 is placed in the step-variable shifting state during a high-speed or high-load running of the vehicle, and placed in the continuously-variable shifting state during a low- or medium-speed running or a low-load running of the vehicle, whereby the fuel economy of the vehicle can be effectively improved.

The method of assembling the drive system 10 according to the present embodiment described above comprises (a) the third step (assembling step) K3 of assembling together the second casing portion (first separate casing) 12*b* and the third casing portion (second separate casing) 12*c* which are a plurality of cylindrical casing portions arranged in the direction of the first and second axes CL1, CL2, (b) the fourth step (transmission-portion installing step) K4 of installing the frictional coupling devices and planetary gear sets of the automatic transmission portion (transmission portion) 20 in the second and third casing portions 12*b*, 12*c* assembled together in the third step K3, through the open end 121 of the third casing portion 12, and (c) the fifth step (support-member fitting step) K5 of fitting the support member 104 in the open end 121 of the third casing portion 12*c*, for rotatably supporting the automatic transmission portion 20 which has been installed through the open end 121 in the fourth step K4. According to this method, the automatic transmission portion 20 which has a large axial dimension and which includes the separate planetary gear sets and frictional coupling devices is inserted and installed in the housing 12 through the open end 121 of the third casing portion 12c, so that the drive system 10 can be assembled with reduced assembling efforts and improved efficiency of assembling.

According to the assembling method of the present embodiment, the support member 104 has a clutch engaging oil passage 184 for operating the frictional coupling devices of step-variable automatic transmission 20. In this case, the drive system can be assembled with higher efficiency than in the case where the clutch engaging oil passage 184 is formed in an additional member such as a support wall.

According to the assembling method of the present embodiment, the drive gear 19 connected to the power transmitting member 18 is disposed on the first axis CL1, and the support member 104 supports the driven gear 21 rotated by the drive gear 19, such that the driven gear 21 is rotatable about the second axis CL2. In this case, the drive system 10 can be assembled with higher efficiency, than in the case where the driven gear 21 is supported rotatably about the second axis CL2, by an additional member.

In the drive system 10 of the present embodiment, the power transmitting member 18 is disposed on the first axis CL1 that is the axis of rotation of the input rotary member 14, while the automatic transmission portion (transmission portion) 20, and the differential drive gear 84 for rotating the final reduction gear device 36 are disposed on the second axis CL2 parallel to the first axis CL1, and the output rotary member 22 of the automatic transmission portion 20 is splined to the differential drive gear 84. Accordingly, the output rotary member 22 of the automatic transmission portion 20 can be connected by spline coupling to the differential drive gear 84, for rotation with the differential drive gear 84, after the pair of casing portions 12a, 12b for rotatably supporting the differential drive gear 84 are assembled together in the first step K1 such that the differential drive gear 84 is rotatably supported by the casing portions 12a, 12b. In this way, the drive system can be easily assembled. That is, the automatic transmission portion 20 can be installed independently of the differential drive gear 84, whereby the assembling of the drive system is facilitated.

The drive system 10 of the present embodiment includes the housing 12 accommodating the members disposed on the first and second axes CL1, CL2, and the housing 12 has the first casing portion 12a and the second casing portion 12b which rotatably support the differential drive gear 84 at its opposite axial end portions. Accordingly, the output rotary member 22 of the automatic transmission portion 20 can be connected by spline coupling to the differential drive gear 84, for rotation with the differential drive gear 84, after the first and second casing portions 12a, 12b for rotatably supporting the differential drive gear 84 are assembled together in the first step K1 such that the differential drive gear 84 is rotatably supported by the casing portions 12a, 12b. Thus, the drive system can be easily assembled.

In the drive system 10 of the present embodiment, the power transmitting member 18 is disposed on the first axis CL1 that is the axis of rotation of the input rotary member 14, while the automatic transmission portion (transmission portion) 20 is disposed on the second axis CL2 parallel to the first axis CL1, and the automatic transmission portion 20 is provided with the first intermediate shaft (input shaft) 40 and the output rotary member 22 which are disposed in series with each other on the second axis CL2 such that the first intermediate shaft 40 and the output rotary member 22 are rotatable relative to each other. These first intermediate shaft 40 and output rotary member 22 of the automatic transmission portion 20 are rotatably supported by the support member 104 and the support wall (support member) 82. In the absence of a support member in an axially intermediate portion of the automatic transmission portion 20, the axial dimension of the automatic transmission portion 20 can be reduced, and the vehicular drive system can be accordingly small-sized. Namely, a support member for directly supporting the second intermediate shaft 42 located in the axially intermediate portion of the automatic transmission portion 20 is not necessary, so that the axial dimension of the automatic transmission portion 20 can be reduced.

In the drive system 10 of the present embodiment, the automatic transmission portion (transmission portion) 20 is provided with the first intermediate shaft (input shaft) 40, second intermediate shaft 42 and output rotary member 22 which are disposed in sires with each other on the second axis CL1 such that the first and second intermediate shafts 40, 42 and the output rotary member 22 are rotatable relative to each other, and the second intermediate shaft 42 of the automatic transmission portion 20 is supported at its opposite axial end portions by the first intermediate shaft 40 and the output rotary member 22, respectively. Since the second intermediate shaft 42 located in the axially intermediate portion of the automatic transmission portion 20 does not require a support wall or support member, the axial dimension of the automatic transmission portion 20 can be reduced.

Embodiment 2

There will be described other embodiments of the present invention. In the following description of the other embodiments, the same reference signs as used in the first embodiment will be used to identify the functionally identical elements, redundant description of which is omitted.

Figure 19:
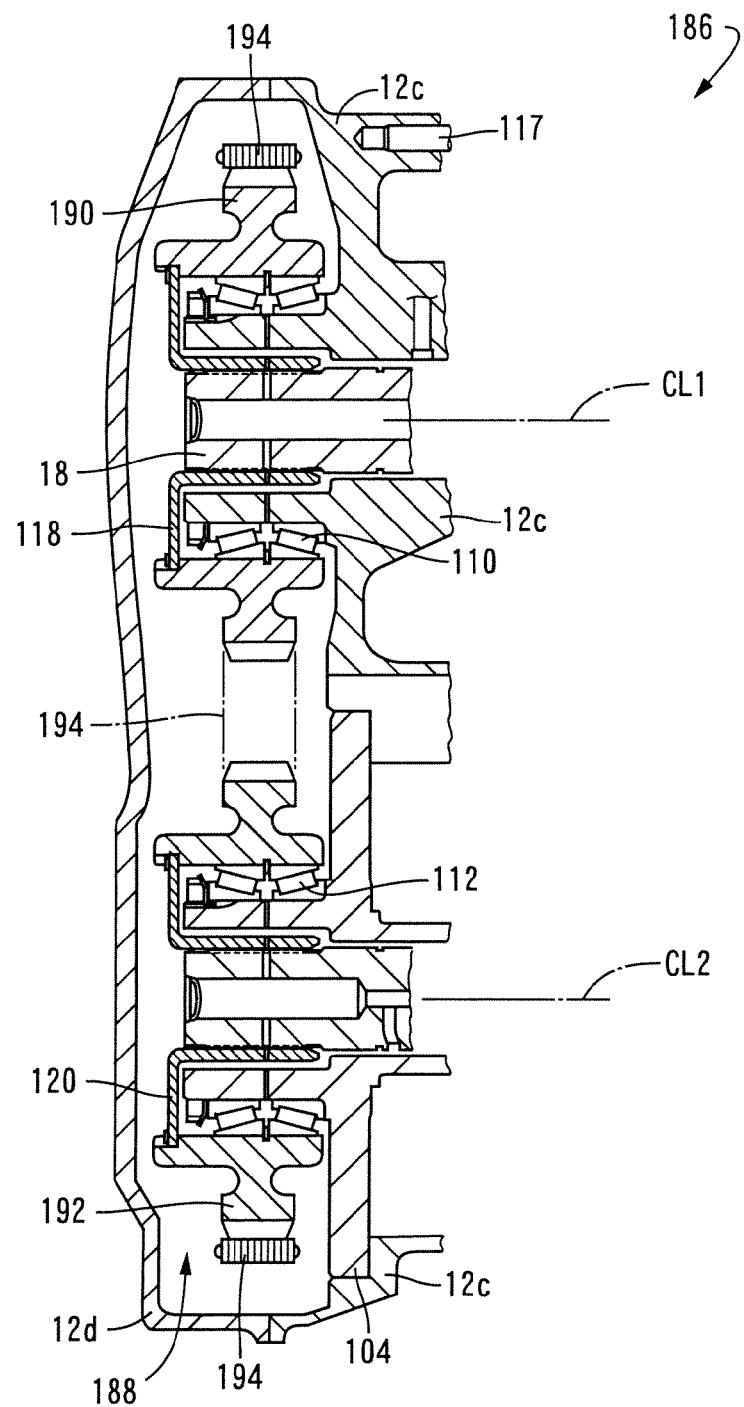
FIG. 19 is a fragmentary cross sectional view showing an arrangement of a drive linkage in another embodiment of this invention.

Referring to the fragmentary cross sectional view of FIG. 19, there is shown a part of a vehicular drive system 186 according to the second embodiment of this invention. This drive system 186 is different from the drive system 10 of the first embodiment, only in that a drive linkage 188 is provided in place of the drive linkage 23. As shown in FIG. 19, the drive linkage 188 includes a drive sprocket 190, a driven sprocket 192, and a connecting belt 194 which is formed of a metal or resin and which connects the drive and driven sprockets 190, 192. The drive sprocket 190 is mounted on the axial end portion of the power transmitting member 18 through the connecting member 118 such that the drive sprocket 190 and the power transmitting member 18 are rotated as a unit about the first axis CL1. The second sprocket 192 is mounted on the axial end portion of the first intermediate shaft 40 through the connecting member 120 such that the driven sprocket 192 and the first intermediate shaft 40 are rotated as a unit about the second axis CL2. Thus, the drive linkage 188 is arranged to transmit a drive force from the power transmitting member 18 to the first intermediate shaft 40 such that the first intermediate shaft 40 is rotated in the same direction as the power transmitting member 18. The present second embodiment has substantially the same advantages as the preceding embodiments.

Embodiment 3

Figure 20:
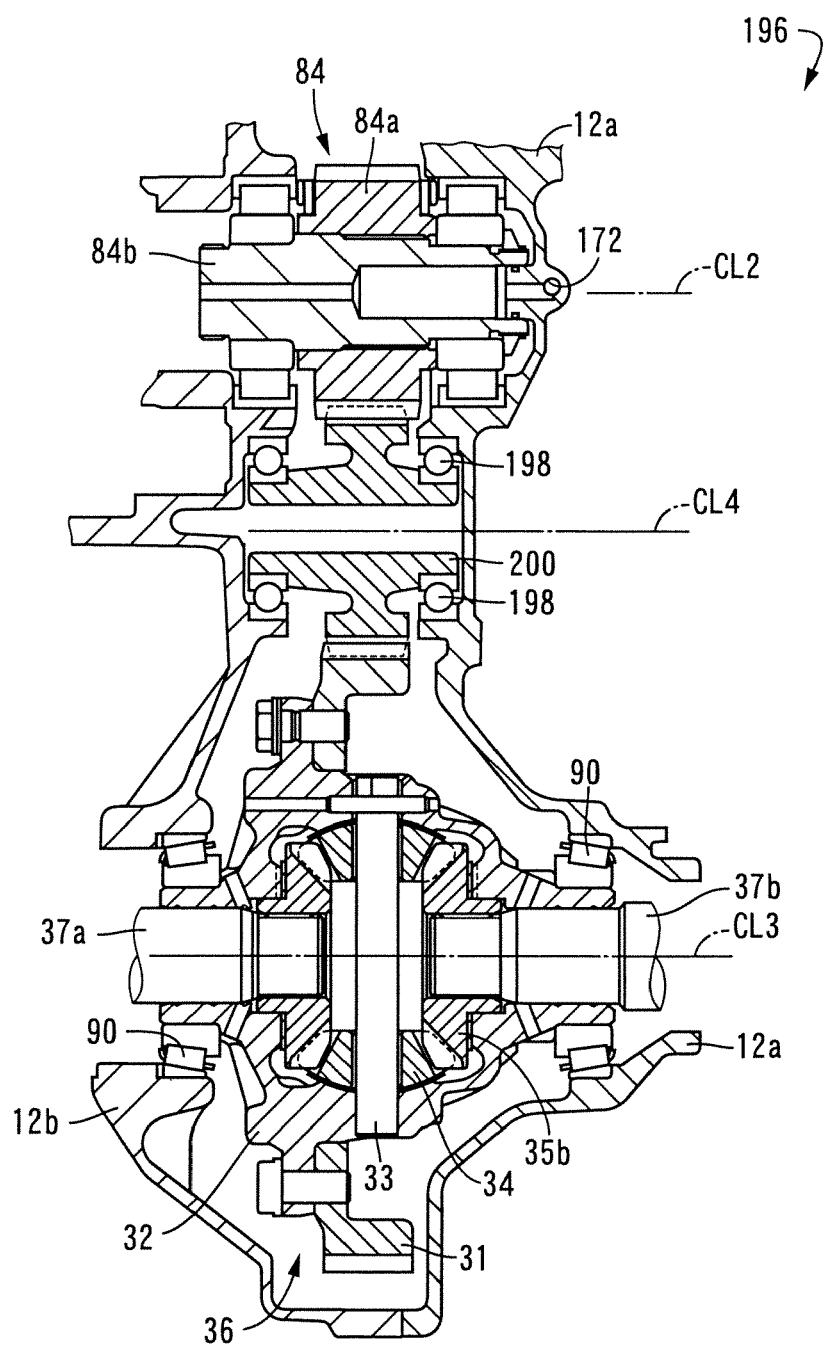
FIG. 20 is a fragmentary cross sectional view showing an arrangement of a power transmitting path between the differential drive gear and the final reduction gear device, in a further embodiment of this invention.

Referring next to the fragmentary cross sectional view of FIG. 20, there is shown a part of a vehicular drive system 196 according to the third embodiment of the invention. This drive system 196 is different from the drive system 10 of the first embodiment, in that the axial position of the engine 8 is opposite to that in the first embodiment, and in that an idler gear 200 is interposed between the differential drive gear 84 and the large-diameter gear 31 of the final reduction gear device 36. The idler gear 200 is rotatably supported by the first and second casing portions 12a, 12b, via bearings 198. In the present third embodiment, a fourth axis CL4 is provided between and in parallel to the second and third axes CL2, CL3, and the idler gear 200 is supported rotatably about the fourth axis CL4, in meshing engagement with the differential drive gear 84 and the large-diameter gear 31 of the final reduction gear device 36. The idler gear 200 transmits a rotary motion from the differential drive gear 84 to the large-diameter gear 31, without a speed change of the rotary motion. The present third embodiment has substantially the same advantages as the preceding embodiments.

Embodiment 4

Figure 21:
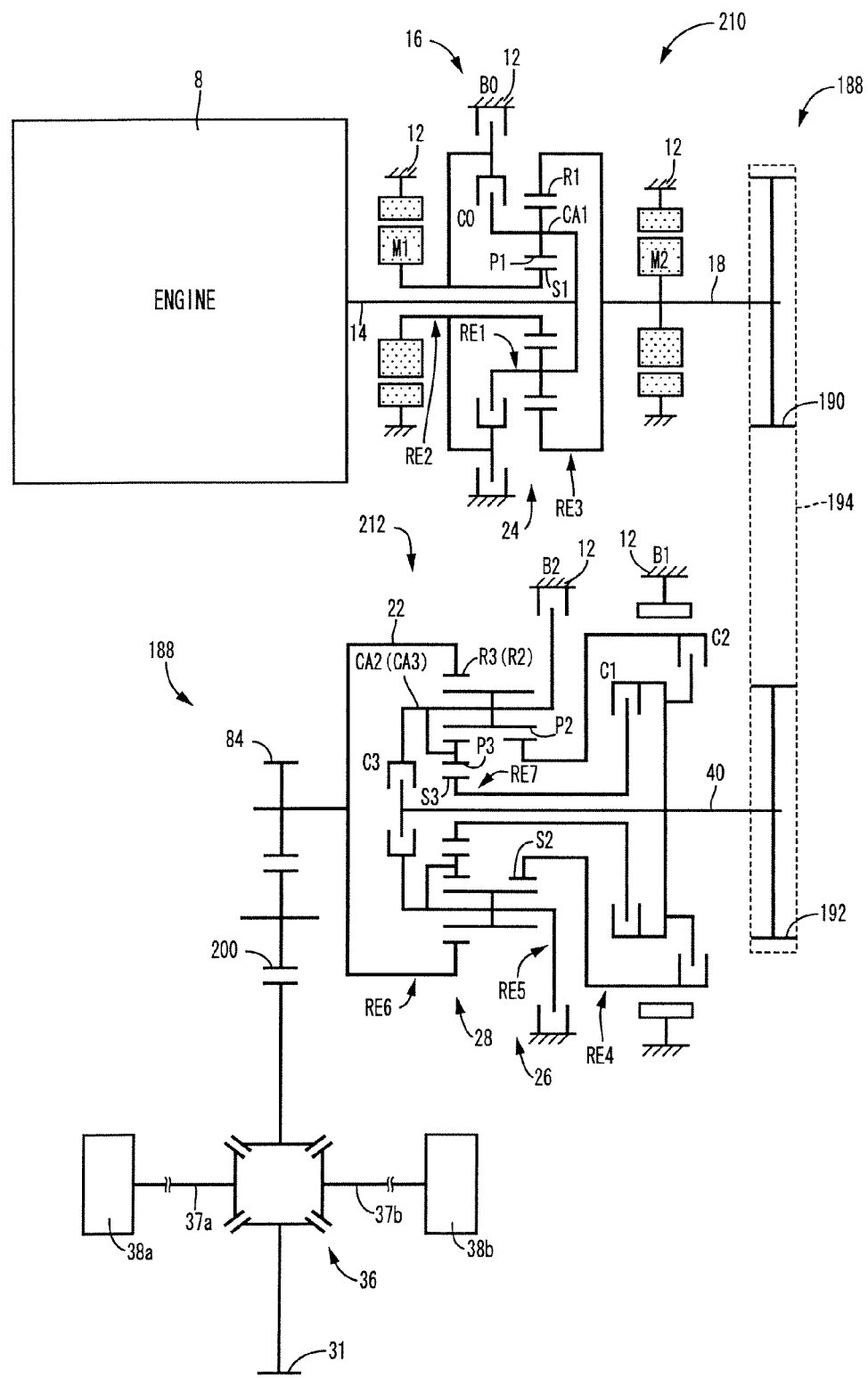
FIG. 21 is a schematic view showing an arrangement of a vehicular drive system constructed according to another embodiment of this invention.

Referring to the schematic view of FIG. 21, there is shown an arrangement of a vehicular drive system 210 according to the fourth embodiment of this invention, which includes an automatic transmission portion 212, and which is accommodated within the housing 12, as in the preceding embodiments. This drive system 210 is different from the drive system 10 of the first embodiment of FIG. 1, in that the drive linkage 188 is provided in place of the drive linkage 23, as in the second embodiment, while the idler gear 200 is interposed between the differential drive gear 84 and the large-diameter gear 31 of the final reduction gear device 36, as in the third embodiment, and in that the automatic transmission portion 212 of Ravigneaux type including two planetary gear sets 26, 28 is provided in place of the automatic transmission portion 20.

The automatic transmission portion 212 includes a single-pinion type second planetary gear set 26, and a single-pinion type third planetary gear set 28. The third planetary gear set 28 has: a third sun gear S3; a plurality of mutually meshing third planetary gears P3; a third carrier CA3 supporting the third planetary gears P3 such that each of the third planetary gears P3 is rotatable about its axis and about the axis of the third sun gear S3; and a third ring gear R3 meshing with the third sun gear S3 through the third planetary gears P3. For example, the third planetary gear set 28 has a gear ratio ρ3 of about 0.315. The second planetary gear set 26 has: a second sun gear S2; a second planetary gear P2 formed integrally with one of the third planetary gears P3; a second carrier CA2 formed integrally with the third carrier CA3; and a second ring gear R2 formed integrally with the third ring gear R3 and meshing with the second sun gear S2 through the second planetary gear P2. For example, the second planetary gear set 26 has a gear ratio ρ2 of about 0.368. The automatic transmission portion 212 is of the Ravigneaux type in which the second and third carriers CA2, CA3 are integral with each other, while the second and third ring gears R2, R3 are integral with each other. The diameter or number of teeth of the second planetary gear P2 which is integral with one of the third planetary gears P3 may be different with that of the third planetary gear P3, The second planetary gear P2 may be formed separately from the third planetary gears P3. Similarly, the second carrier CA2 and the second ring gear R2 may be formed separately from the respective third carrier CA3 and ring gear R3. Where the numbers of teeth of the second sun gear S2, second ring gear R2, third sun gear S3 and third ring gear R3 are represented by ZS2, ZR2, ZS3 and ZR3, respectively, the above-indicated gear ratios ρ2 and ρ3 are represented by ZS2/ZR2 and ZS3/ZR3, respectively.

In the automatic transmission portion 212, the second sun gear S2 is selectively connected to the first intermediate shaft 40 through the second clutch C2, and selectively fixed to the housing 12 through the first brake B1. The second carrier CA2 and the third carrier CA3 are selectively connected to the first intermediate shaft 40 through the third clutch C3, and selectively fixed to the housing 12 through the second brake B2, while the second ring gear R2 and the third ring gear R3 are fixed to the output rotary member 22. The third sun gear S3 is selectively connected to the first intermediate shaft 40 through the first clutch C1. The present fourth embodiment has substantially the same advantages as the preceding embodiments.

In the vehicular drive system 210 constructed as described above, one of a first gear position (first speed position) through a fifth gear position (fifth speed position), a reverse gear position (rear drive position) and a neural position is selectively established by engaging actions of a corresponding combination of the frictional coupling devices selected from the above-described switching clutch C0, first clutch C1, second clutch C2, third clutch C3, switching brake B0, first brake BD and second brake B2, as indicated in the table of FIG. 22. In the present embodiment, too, the power distributing mechanism 16 is provided with the switching clutch C0 and brake B0, so that the power distributing mechanism 16 can be selectively placed by engagement of the switching clutch C0 or switching brake B0, in the fixed-speed-ratio shifting state in which the power distributing mechanism 16 is operable as a transmission having a single gear position with one speed ratio or a plurality of gear positions with respective speed ratios, as well as in the continuously-variable shifting state in which the power distributing mechanism 16 is operable as a continuously variable transmission, as described above. In the present vehicular drive system 210, therefore, a step-variable transmission is constituted by the automatic transmission portion 212, and the power distributing mechanism 16 which is placed in the fixed-speed-ratio shifting state by engagement of the switching clutch C0 or switching brake B0, and a continuously variable transmission is constituted by the automatic transmission portion 212, and the power distributing mechanism 16 which is placed in the continuously-variable shifting state, with none of the switching clutch C0 and brake B0 being engaged.

Embodiment 5

Figure 23:
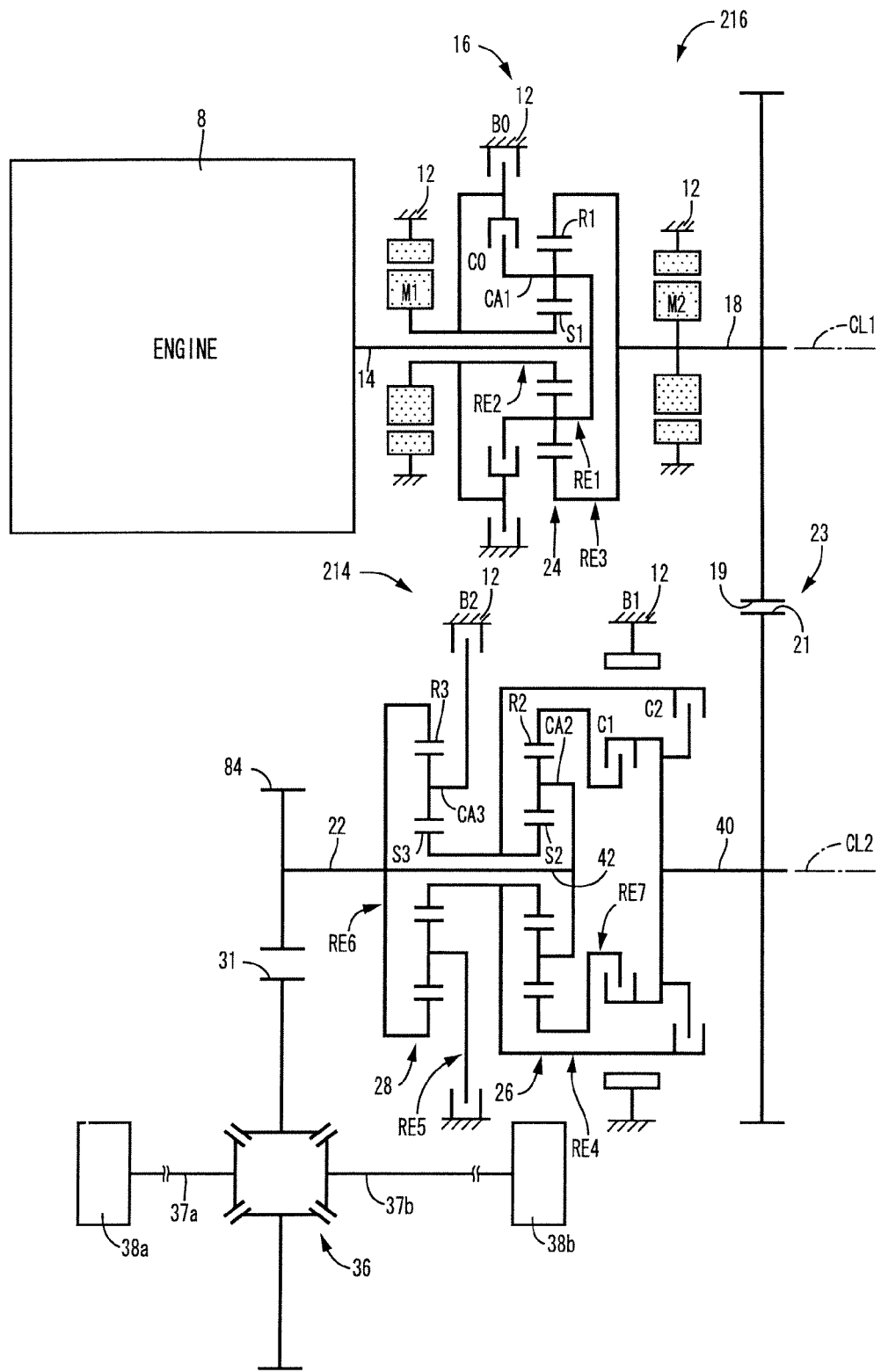
FIG. 23 is a schematic view showing an arrangement of a vehicular drive system constructed according to a further of this invention.

Referring to the schematic view of FIG. 23, there is shown an arrangement of a vehicular drive system 216 according to the fifth embodiment of this invention, which includes an automatic transmission portion 214, and which is accommodated within the housing 12, as in the preceding embodiments. This drive system 216 is different from the drive system 10 of the first embodiment, in that the axial position of the engine 8 is opposite to that in the first embodiment, and the automatic transmission portion 214 is provided in place of the automatic transmission portion 20.

The automatic transmission portion 214 includes a single-pinion type second planetary gear set 26 having a gear ratio ρ2 of about 0.532, and a single-pinion type third planetary gear set 28 having a gear ratio ρ3 of about 0.418. The second sun gear S2 of the second planetary gear set 26 and the third sun gear S3 of the third planetary gear set 28 are formed integrally with each other, selectively connected to the first intermediate shaft 40 through the second clutch C2, and selectively fixed to the housing 12 through the first brake B1. The second carrier CA2 of the second planetary gear set 26 and the third ring gear R3 of the third planetary gear set 28 are formed integrally with each other, and fixed to the output rotary member 22. The second ring gear R2 is selectively connected to the first intermediate shaft 40 through the first clutch C1, and the third carrier CA3 is selectively fixed to the housing 12 through the second brake B2.

In the vehicular drive system 216 constructed as described above, one of a first gear position (first speed position) through a fourth gear position (fourth speed position), a reverse gear position (rear drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 24. Those gear positions have respective speed ratios 7 (input shaft speed $N_{IN}$/output shaft speed $N_{OUT}$) which change as geometric series. In the present embodiment, too, the power distributing mechanism 16 is provided with the switching clutch C0 and brake B0, so that the power distributing mechanism 16 can be selectively placed by engagement of the switching clutch C0 or switching brake B0, in the fixed-speed-ratio shifting state in which the power distributing mechanism 16 is operable as a transmission having a single gear position with one speed ratio or a plurality of gear positions with respective speed ratios, as well as in the continuously-variable shifting state in which the power distributing mechanism 16 is operable as a continuously variable transmission, as described above.

Embodiment 6

Figure 25:
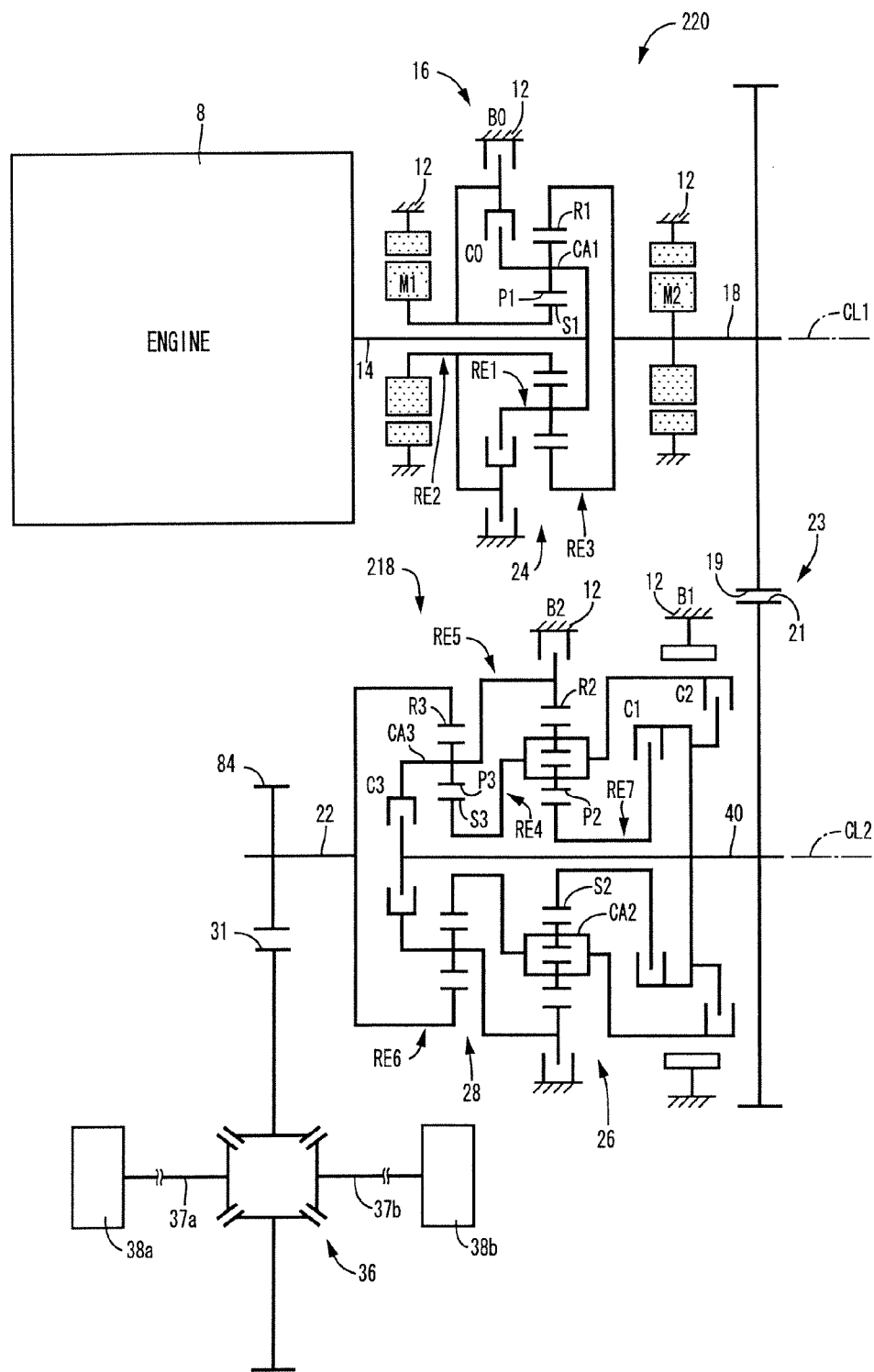
FIG. 25 is a schematic view showing an arrangement of a vehicular drive system constructed according to a further embodiment of this invention.

Referring to the schematic view of FIG. 25, there is shown an arrangement of a vehicular drive system 220 according to the sixth embodiment of this invention, which includes an automatic transmission portion 218, and which is accommodated within the housing 12, as in the preceding embodiments. This drive system 220 is different from the drive system 210 of the fourth embodiment of FIG. 21, in that the automatic transmission portion 218 is provided in place of the automatic transmission portion 212, and the drive linkage 23 is provided in place of the drive linkage 188, while the idler gear 200 is not provided.

The automatic transmission portion 218 includes a double-pinion type second planetary gear set 26, and a single-pinion type third planetary gear set 28. The second planetary gear set 26 has: a second sun gear S2; a plurality of mutually meshing second planetary gears P2; a second carrier CA2 supporting the second planetary gears P2 such that each of the second planetary gears P2 is rotatable about its axis and about the axis of the second sun gear S2; and a second ring gear R2 meshing with the second sun gear S2 through the second planetary gears P2. For example, the second planetary gear set 26 has a gear ratio ρ2 of about 0.461. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio ρ3 of about 0.368.

The automatic transmission portion 218 is provide with the first and second brakes B1, B2 and the first, second and third clutches C1-C3. The second sun gear S2 is selectively connected to the power transmitting member 18 through the first clutch C1, and the second carrier CA2 and the third sun gear S3 are formed integrally with each other, selectively connected to the first intermediate shaft 40 through the second clutch C2, and selectively fixed to the housing 12 through the first brake B1. The second ring gear R2 and the third carrier CA3 are formed integrally with each other, selectively connected to the first intermediate shaft 40 through the third clutch C3, and fixed to the housing 12 through the second brake B2, while the third ring gear R3 is fixed to the output rotary member 22. In the present sixth embodiment, the shifting actions of the automatic transmission portion 218 are performed as indicated in the table of FIG. 22 used in the fourth embodiment. The present sixth embodiment has substantially the same advantages as the preceding embodiments.

While the preferred embodiments of this invention have been described above by reference to the accompanying drawings, for illustrative purpose only, it is to be understood that the present invention may be embodied with various changes and modifications, as described below.

In the vehicular drive systems 10, etc. of the illustrated embodiments, the power distributing mechanism 16 is placed selectively in one of its differential state and non-differential state, so that the drive system 10 is switchable between the continuously-variable shifting state in which the drive system is operable as an electrically controlled continuously-variable transmission, and the step-variable shifting state in which the drive system is operable as a step-variable transmission. However, the switching between the continuously-variable shifting state and the step-variable shifting state is one form of the switching between the differential state and the non-differential state of the power distributing mechanism 16. For instance, the power distributing mechanism 16 may be operated as a step-variable transmission the speed ratio of which is variable in steps, even while the power distributing mechanism 16 is placed in the differential state.

In the power distributing mechanism 16 in the illustrated embodiments, the first carrier CA1 is fixed to the engine 8, and the first sun gear S1 is fixed to the first electric motor M1 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the differential mechanism input shaft 14 in the illustrated embodiments, the engine 8 may be operatively connected to the input shaft 14 through any suitable member such as gears and a belt, and need not be disposed coaxially with the input shaft 14.

Although the power distributing mechanism 16 in the illustrated embodiments is provided with the switching clutch C0 and the switching brake B0, the power distributing mechanism 16 need not be provided with both of the switching clutch C0 and brake B0. While the switching clutch C0 is provided to selectively connect the first sun gear S1 and the first carrier CA1 to each other, the switching clutch C0 may be provided to selectively connect the first sun gear S1 and the first ring gear R1 to each other, or selectively connect the first carrier CA1 and the first ring gear R1. Namely, the switching clutch C0 may be arranged to connect any two elements of the three elements of the first planetary gear set 24.

While the switching clutch C0 is engaged to establish the neutral position N in the drive systems 10, 210, 216, 220 of the illustrated embodiments, the switching clutch C0 need not be engaged to establish the neutral position.

The frictional coupling devices used as the switching clutch C0, switching brake B0, etc. in the illustrated embodiments may be replaced by a coupling device of a magnetic-power type, an electromagnetic type or a mechanical type, such as a powder clutch (magnetic powder clutch), an electromagnetic clutch and a meshing type dog clutch.

Each of the drive systems 10, 210, 216, 220 according to the illustrated embodiments is a drive system for a hybrid vehicle in which the drive wheels 38 can be driven by not only the engine 8 but also the first electric motor or the second electric motor M2. However, the principle of the present invention is applicable to a vehicular drive system in which the power distributing mechanism 16 is not operable in a hybrid control mode, and functions only as a continuously variable transmission so-called an "electric CVT".

While the power distributing mechanism 16 is constituted by one planetary gear set in the illustrated embodiments, the power distributing mechanism 16 may be constituted by two or more planetary gear sets. In this case, the power distributing mechanism 16 functions as a transmission having three or more gear positions in the fixed-speed-ratio shifting state.

In the illustrated embodiments, the automatic transmission portion 20 includes the three planetary gear sets 26, 28 and 30. However, the automatic transmission portion 20 may be replaced by a speed reducing mechanism including one planetary gear set, as disclosed in the previously identified Patent Document, and may include four or more planetary gear sets. Namely, the construction of the automatic transmission is not limited to the details of the illustrated embodiments, in the number of the planetary gear sets, the number of the gear positions, and the selective connections of the clutches C and brakes B to the elements of the planetary gear sets.

The vehicular drive systems of FIGS. 1, 21, 23 and 25 may be modified such that the second electric motor M2 is disposed on one axial side of the drive gear 19 which is remote from the first planetary gear set 24, and/or such that the first clutch C1 is disposed on one axial side of the driven gear 21 which is remote from the second planetary gear set 26.

Although the support walls 82, 98 in the illustrated embodiments are formed integrally with the housing 12, these support walls may be formed separately from the housing 12 and fixed to the housing 12. Conversely, the support wall 96 formed separately from the housing 12 and fixed to the housing 12 may be formed integrally with the housing 12.

The second electric motor M2 may be disposed at any position in the power transmitting path between the power transmitting member 18 and the drive wheels 38, and may be operatively connected to the power transmitting path, either directly, or indirectly via a belt, gears, a speed reducing device, etc.

It is to be understood that the embodiments described above are given for illustrating the present invention and that the invention may be embodied with various other changes and modifications which may occur to those skilled in the art.

The invention claimed is:

1. A vehicular drive system including a differential portion operable to distribute a drive force received by an input rotary member to a first electric motor and a power transmitting member, a second electric motor disposed in a power transmitting path between said power transmitting member and a drive wheel of a vehicle, a transmission portion disposed between said power transmitting member and said drive wheel, and a drive linkage through which said transmission portion is connected to said power transmitting member, said vehicular drive system comprising:
said first electric motor, differential portion and second electric motor being disposed on a first axis about which said input rotary member is rotated;
said transmission portion being disposed on a second axis parallel to said first axis;
a cap-shaped first casing portion covering one axial portion of said first electric motor;
a cylindrical second casing portion disposed adjacent to said first casing portion and cooperating with said first casing portion to define a first accommodating chamber in which said first electric motor is accommodated;
a cylindrical third casing portion disposed adjacent to and on one side of said second casing portion remote from said first casing portion, and cooperating with said second casing portion to define a second accommodating chamber in which said differential portion and said second electric motor are accommodated, and a third accommodating chamber in which said transmission portion is accommodated;
a cap-shaped fourth casing portion disposed adjacent to said third casing portion and cooperating with said third casing portion to define a fourth accommodating chamber in which said drive linkage is accommodated; and
said first, second, third and fourth casing portions are connected to each other to constitute a housing of the vehicular drive system.

2. The vehicular drive system according to claim 1, wherein a rotor of said first electric motor is rotatably supported by said first casing portion and said second casing portion.

3. The vehicular drive system according to claim 1, wherein a rotor of said second electric motor is rotatably supported by said third casing portion.

4. The vehicular drive system according to claim 1, wherein said differential portion includes a hydraulically operated differential limiting device for selectively switching said differential portion between a differential state and a non-differential state,
and wherein said second casing portion has an oil passage through which a working oil is supplied to said hydraulically operated differential limiting device.

5. The vehicular drive system according to claim 1, wherein said transmission portion is provided with a plurality of hydraulically operated frictional coupling devices, and is shifted to one of a plurality of operating positions which is selected by engaging a corresponding one of a plurality of different combinations of said frictional coupling devices,
and wherein said second casing portion has an oil passage through which a working oil is supplied to said hydraulically operated frictional coupling devices.

6. The vehicular drive system according to claim 1, wherein said third casing portion includes a radially inwardly extending support wall which rotatably supports a rotor of said second electric motor.

7. The vehicular drive system according to claim 1, wherein said drive linkage consists of a drive gear disposed on said first axis and a driven gear which is disposed on said second axis and driven by said drive gear,
and wherein said drive gear is rotatably supported by a support wall radially inwardly extending from said third casing portion, while said driven gear is rotatably supported by a support member fitted in said third casing portion.

8. The vehicular drive system according to claim 1, wherein said differential portion cooperates with said first electric motor and said second electric motor to constitute an electrically controlled continuously variable transmission portion a speed ratio of which is continuously variable.

9. The vehicular drive system according to claim 1, wherein said drive linkage connects a first rotary member located at one end portion of said first axis remote from said input rotary member and a second rotary member at one end portion of said second axis remote from said input rotary member, for transmission of the drive force between said first and second rotary members.

10. The vehicular drive system according to claim 1, wherein said differential portion includes a differential limiting device operable to selectively place said differential portion in a differential state in which a differential function of the differential portion is not limited, and a non-differential state in which said differential function is limited, said vehicular drive system further comprising switching control means operable to control said differential limiting device on the basis of a condition of the vehicle, for placing said differential portion in a selected one of said differential and non-differential states.

11. The vehicular drive system according to claim 10, wherein said condition of the vehicle is determined on the basis of a predetermined upper limit value of a running speed of the vehicle, and said switching control means controls said differential limiting device to place said differential portion in said non-differential state when an actual value of the running speed of the vehicle is higher than said predetermined upper limit value.

12. The vehicular drive system according to claim 10, wherein said condition of the vehicle is determined on the basis of a predetermined upper limit value of a drive-force-related value of the vehicle, and said switching control means controls said differential limiting device to place said differential portion in said non-differential state when said drive-force-related value of the vehicle is higher than said predetermined upper limit value.

13. The vehicular drive system according to claim 10, wherein said condition of the vehicle is determined on the basis of an actual value of a running speed of the vehicle and an actual value of a drive-force-related value of the vehicle, and according to a stored switching boundary line map including a high-speed-running boundary line and a high-output-running boundary line which are defined by said running speed and said drive-force-related value.

14. The vehicular drive system according to claim 13, wherein said drive-force-related value is an output torque of said transmission portion.

* * * * *